United States Patent
Tedesco et al.

(10) Patent No.: US 11,164,362 B1
(45) Date of Patent: Nov. 2, 2021

(54) VIRTUAL REALITY USER INTERFACE GENERATION

(71) Applicant: Amazon Technologies, Inc., Seattle, WA (US)

(72) Inventors: Michael Tedesco, Sammamish, WA (US); David Robert Cole, Brier, WA (US); Lane Daughtry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/799,114

(22) Filed: Feb. 24, 2020

Related U.S. Application Data

(63) Continuation of application No. 15/716,268, filed on Sep. 26, 2017, now Pat. No. 10,614,616.

(51) Int. Cl.
| | |
|---|---|
| *G06T 15/20* | (2011.01) |
| *G06F 3/05* | (2006.01) |
| *G06F 3/0481* | (2013.01) |
| *G06Q 30/06* | (2012.01) |
| *G06F 3/16* | (2006.01) |
| *G06F 3/0482* | (2013.01) |

(52) U.S. Cl.
CPC .......... *G06T 15/20* (2013.01); *G06F 3/04815* (2013.01); *G06Q 30/0643* (2013.01); *G06F 3/0482* (2013.01); *G06F 3/167* (2013.01); *G06T 2200/24* (2013.01)

(58) Field of Classification Search
None
See application file for complete search history.

(56) References Cited

U.S. PATENT DOCUMENTS

| | | |
|---|---|---|
| D2,911 S | 2/1868 | Gautier |
| D391,298 S | 2/1998 | Johnson et al. |
| 5,880,733 A | 3/1999 | Horvitz et al. |
| D458,611 S | 6/2002 | Gallo |

(Continued)

OTHER PUBLICATIONS

"CINEMUR" Feb. 24, 2016, posted at twitter.com, [site visited May 13, 2020] https://twitter.com/cinemur/status/702455483286867969 (Year: 2016).

(Continued)

*Primary Examiner* — Tapas Mazumder
(74) *Attorney, Agent, or Firm* — Athorus, PLLC

(57) ABSTRACT

Systems and methods for generating virtual reality user interfaces are described. The virtual reality user interface may include a three-dimensional model that simulates an actual environment. In addition, the virtual reality user interface may include a plurality of cells arranged at a simulated depth and with a simulated curvature. Further, the plurality of cells may be divided into a plurality of subcells. The subcells may be sized based at least in part on aspect ratios of images to be included in each of the subcells. Moreover, supplemental cells may be provided around or within the plurality of cells and subcells, each of the supplemental cells representing a collection of items. The variable sizing of the subcells as well as the incorporation of supplemental cells around or within the plurality of cells and subcells may result in a virtual reality user interface with higher user interest and engagement.

18 Claims, 18 Drawing Sheets

(56) References Cited

U.S. PATENT DOCUMENTS

| | | |
|---|---|---|
| 6,577,330 B1 | 6/2003 | Tsuda et al. |
| 7,106,328 B2 | 9/2006 | Royan |
| 7,107,549 B2 | 9/2006 | Deaton et al. |
| D549,713 S | 8/2007 | Lewin et al. |
| D562,838 S | 2/2008 | Salunkhe |
| D563,968 S | 3/2008 | Lewin et al. |
| D600,249 S | 9/2009 | Nagata et al. |
| D604,742 S | 11/2009 | Nagata et al. |
| D605,199 S | 12/2009 | Nagata et al. |
| 7,840,907 B2 | 11/2010 | Kikuchi et al. |
| 7,865,834 B1 | 1/2011 | Os et al. |
| D633,921 S | 3/2011 | Brinda |
| D640,272 S | 6/2011 | Arnold et al. |
| D665,414 S | 8/2012 | Lee et al. |
| D666,625 S | 9/2012 | Gilmore et al. |
| D668,671 S | 10/2012 | Zaman et al. |
| 8,286,100 B2 | 10/2012 | Helfman et al. |
| D676,864 S | 2/2013 | Velasco et al. |
| D681,044 S | 4/2013 | Sakata |
| D684,991 S | 6/2013 | Wenz et al. |
| 8,494,902 B2 | 7/2013 | Krantz et al. |
| D689,873 S | 9/2013 | Brinda et al. |
| D692,456 S | 10/2013 | Brinda et al. |
| D697,079 S | 1/2014 | Yuk et al. |
| D697,936 S | 1/2014 | Lee et al. |
| D701,239 S | 3/2014 | Wenz et al. |
| D705,250 S | 5/2014 | Khanna |
| D705,800 S | 5/2014 | Khanna |
| D710,873 S | 8/2014 | Nakada |
| D714,331 S | 9/2014 | Lawson et al. |
| D717,826 S | 11/2014 | Lacour et al. |
| D718,776 S | 12/2014 | Hobbs et al. |
| D722,321 S | 2/2015 | Lee et al. |
| D728,585 S | 5/2015 | Lee et al. |
| D731,505 S | 6/2015 | Kyakuno et al. |
| D733,723 S | 7/2015 | Brinda et al. |
| D734,766 S | 7/2015 | Hyo-Sang et al. |
| D737,292 S | 8/2015 | Donahue et al. |
| D737,850 S | 9/2015 | Seo et al. |
| D739,870 S | 9/2015 | Roberts et al. |
| D742,901 S | 11/2015 | Choi et al. |
| D744,509 S | 12/2015 | Moriya |
| D750,119 S | 2/2016 | Agarwal |
| D752,634 S | 3/2016 | Yoon et al. |
| D754,148 S | 4/2016 | Yoon et al. |
| D754,154 S | 4/2016 | Moon et al. |
| D754,157 S | 4/2016 | Moon et al. |
| D756,385 S | 5/2016 | Kim et al. |
| D757,064 S | 5/2016 | Seo et al. |
| D757,066 S | 5/2016 | Seo et al. |
| D757,759 S | 5/2016 | Ku et al. |
| D757,760 S | 5/2016 | Ku et al. |
| D758,396 S | 6/2016 | Kim et al. |
| D759,071 S | 6/2016 | Yu et al. |
| D760,275 S | 6/2016 | Zhang |
| D761,285 S | 7/2016 | Kim et al. |
| D761,286 S | 7/2016 | Kim et al. |
| D763,867 S | 8/2016 | Moon et al. |
| D763,899 S | 8/2016 | Lee |
| D763,900 S | 8/2016 | Jeon et al. |
| D764,534 S | 8/2016 | Seo et al. |
| D765,708 S | 9/2016 | Gagnier |
| D766,943 S | 9/2016 | Moriya |
| D766,970 S | 9/2016 | Gagnier |
| D768,163 S | 10/2016 | Holl |
| D768,187 S | 10/2016 | Wenz et al. |
| D768,705 S | 10/2016 | Gagnier |
| D768,706 S | 10/2016 | Gagnier |
| D770,495 S | 11/2016 | Knapp |
| D770,499 S | 11/2016 | Rodriguez |
| D770,500 S | 11/2016 | Rodriguez |
| D771,075 S | 11/2016 | Moriya |
| D771,111 S | 11/2016 | Roberts et al. |
| D772,262 S | 11/2016 | Moon et al. |
| D775,169 S | 12/2016 | Gottlieb |
| D778,293 S | 2/2017 | Paek |
| D781,873 S | 3/2017 | Wu et al. |
| D786,289 S | 5/2017 | Kim et al. |
| D787,541 S | 5/2017 | Kang et al. |
| D789,378 S | 6/2017 | Gottlieb |
| D794,664 S | 8/2017 | Okabe et al. |
| D797,767 S | 9/2017 | Esselstrom et al. |
| D800,738 S | 10/2017 | Xu et al. |
| D809,003 S | 1/2018 | Sowden et al. |
| D821,439 S | 6/2018 | Sowden et al. |
| D823,337 S | 7/2018 | Shelksohn et al. |
| D825,597 S | 8/2018 | Jann et al. |
| D826,965 S | 8/2018 | Smith et al. |
| D828,383 S | 9/2018 | Liao et al. |
| D828,384 S | 9/2018 | Nilsson et al. |
| D828,385 S | 9/2018 | Nilsson et al. |
| D828,386 S | 9/2018 | Nilsson et al. |
| D830,378 S | 10/2018 | Li et al. |
| D830,379 S | 10/2018 | Li et al. |
| D834,598 S | 11/2018 | Bae et al. |
| D836,121 S | 12/2018 | Leong et al. |
| D838,739 S | 1/2019 | Coffman et al. |
| D841,686 S | 2/2019 | Kim et al. |
| D843,411 S | 3/2019 | Montgomery et al. |
| D845,331 S | 4/2019 | Malahy et al. |
| D845,338 S | 4/2019 | Wu et al. |
| D849,763 S | 5/2019 | Jones |
| D850,474 S | 6/2019 | Karunamuni |
| D868,832 S | 12/2019 | Brown |
| D879,135 S | 3/2020 | Wang |
| 10,614,616 B1 | 4/2020 | Tedesco et al. |
| 2001/0028369 A1 | 10/2001 | Gallo et al. |
| 2002/0163546 A1 | 11/2002 | Gallo |
| 2003/0164827 A1 | 9/2003 | Gottesman et al. |
| 2004/0066411 A1 | 4/2004 | Fung et al. |
| 2005/0278656 A1 | 12/2005 | Goldthwaite et al. |
| 2006/0100784 A1* | 5/2006 | Wang ............... G01W 1/00 702/3 |
| 2006/0156228 A1 | 7/2006 | Gallo et al. |
| 2008/0021684 A1 | 1/2008 | Dulac et al. |
| 2008/0059893 A1 | 3/2008 | Byrne et al. |
| 2010/0030578 A1 | 2/2010 | Siddique et al. |
| 2010/0073454 A1 | 3/2010 | Lovhaugen et al. |
| 2010/0098342 A1 | 4/2010 | Davis et al. |
| 2010/0131294 A1 | 5/2010 | Venon et al. |
| 2011/0138313 A1 | 6/2011 | Decker et al. |
| 2011/0138330 A1 | 6/2011 | Sanders et al. |
| 2011/0169927 A1 | 7/2011 | Mages et al. |
| 2011/0320044 A1 | 12/2011 | Smith et al. |
| 2012/0081356 A1 | 4/2012 | Filippov et al. |
| 2012/0254791 A1 | 10/2012 | Jackson et al. |
| 2013/0117260 A1 | 5/2013 | Barrett et al. |
| 2013/0311153 A1 | 11/2013 | Moughler et al. |
| 2014/0092136 A1 | 4/2014 | Aoshima et al. |
| 2014/0176479 A1 | 6/2014 | Wardenaar |
| 2014/0194183 A1 | 7/2014 | Pierer et al. |
| 2014/0337749 A1 | 11/2014 | Phang et al. |
| 2015/0074504 A1 | 3/2015 | Steinfl et al. |
| 2015/0085058 A1 | 3/2015 | Zhang et al. |
| 2015/0178321 A1 | 6/2015 | Rivlin et al. |
| 2016/0132806 A1 | 5/2016 | To et al. |
| 2016/0139761 A1 | 5/2016 | Grosz et al. |
| 2018/0150433 A1 | 5/2018 | Sowden et al. |
| 2018/0232340 A1 | 8/2018 | Lee |
| 2018/0247024 A1* | 8/2018 | Divine ............... G06K 9/00671 |

OTHER PUBLICATIONS

Kovach, Steve, "Google's virtual reality ambitions appear to be off to a slow start" Jan. 20, 2017, posted at businessinsider.com, [site visited May 13, 2020], https://www.businessinsider.com.au/google-slashes-price-daydream-virtual-reality-headset-2017-1 (Year: 2017).

Wales, James, "How to design for Virtual Reality" Apr. 21, 2017, posted at bunnyfoot.com, [site visited May 13, 2020] https://www.bunnyfoot.com/2017/04/ux-principles-virtual-reality (Year: 2017).

Berls, Bruce, "The Windows 10 Start Menu is a Cluttered Mess" May 26, 2015, posted at brucebnews.com, [site visited Mar. 9,

(56) References Cited

OTHER PUBLICATIONS

2020]. https://www.brucebnews.com/2015/05/the-windows-10-start-menu-is-a-cluttered-mess/ (Year: 2015), 1 page.

Ocić, Boris, "SAP is Making the Move From GUI to VR", Apr. 4, 2017, posted at ictbusiness.biz, [site visited Mar. 6, 2020]. https://www.ictbusiness.biz/ict-solutions/sap-is-making-the-move-from-gui-to-vr (Year: 2017) 1 page.

Ramotion, "VR Menu" Oct. 28, 2016, posted at dribbble.com, [site visited Mar. 6, 2020]. https://dribbble.com/shots/3055151-VR-Menu-GitHub (Year: 2016), 1 page.

Riley, J.B.S., "Ex-tee, Ex-tree!", Feb. 27, 2009, posted at doghouseriley.com, [site visited Mar. 5, 2020]. http://doghouseriley.blogspot.com/2009_02_01_archive.html (Year: 2009), 2 pages.

Shutterstock, "3D Technology, Virtual Reality, Entertainment, Cyberspace and People Concept", May 19, 2017, posted at shutterstock.com, [site visited Mar. 5, 2020]. https://www.shutterstock.com/image-photo/3d-technology-virtual-reality-entertainment-cyberspace-437648755 (Year: 2017), 2 pages.

ThinkMobiles, "How Much Does it Cost to Make Virtual Reality Tour for Real Estate?", Jul. 2, 2017, posted at thinkmobiles.com, [site visited Mar. 6, 2020]https://web.archive.org/web/20170702054849/https://thinkmobiles.com/blog/cost-to-make-vr-tour-for-real-estate/ (Year: 2017), 2 pages.

VRLife, "Screen_Shot_Feb. 26, 2015 _at_2. 04.00 _PM", Feb. 26, 2015, posted at vrlife .news, [ site visited Mar. 9, 2020]. https://www.vrlife.news/communicating-vr-altspace-vr_trashed/screen_shot_2015-02-26_at_2-04-00_pm (Year: 2015), 2 pages.

Vu, Cuong, "IOS in Virtual Reality" Jun. 11, 2016, posted at dribbble.com, [site visited Mar. 9, 2020]. https://dribbble.com/cuongvq (Year: 2016), 2 pages.

Brant, Tom, "Google: 180-Degree Video is the Future of VR", Jun. 23, 2017, posted at sea.pcmag.com, [site visited Oct. 6, 2020] https://sea.pcmag.com/news/16249/google-180-degree-video-is-the-future-of-vr (Year: 2017), 1 page.

Sproll, Daniel, "Virtual Reality Menu Design—Part 2", Dec. 9, 2015, posted at re-flekt.com, [site visited Oct. 6, 2020] https://www.re-flekt.com/blog/virtual-reality-menu-design-part-2 (Year: 2015), 3 pages.

* cited by examiner

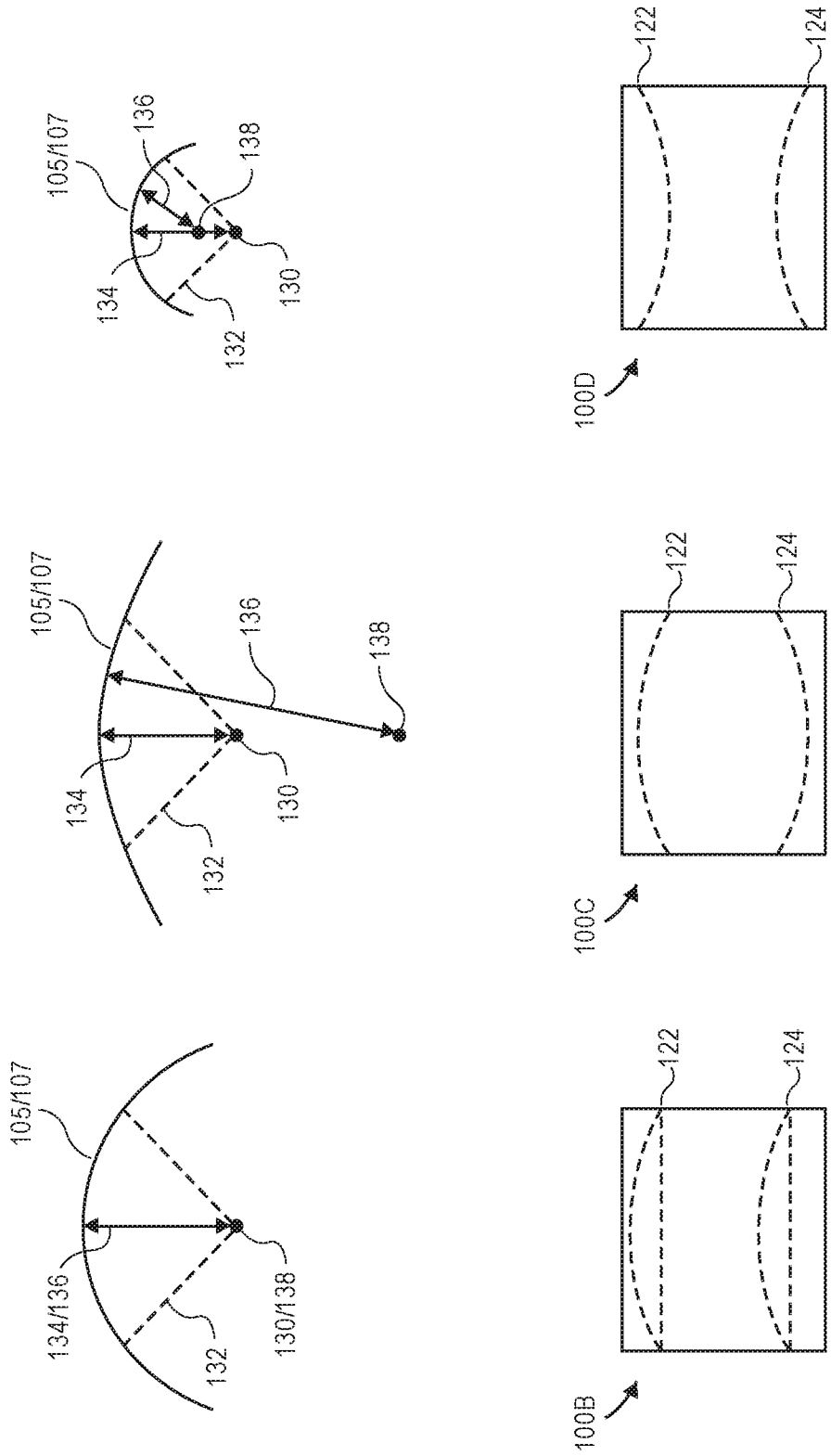

VIRTUAL REALITY USER INTERFACE GENERATION

CROSS-REFERENCE TO RELATED APPLICATION

This application is a continuation of and claims priority to U.S. application Ser. No. 15/716,268, filed Sep. 26, 2017, the contents of which are herein incorporated by reference in their entirety.

BACKGROUND

Virtual reality devices such as headsets with corresponding controllers are increasing in use. Generally, virtual reality devices may allow users to be completely immersed in digital environments such as video games. However, users of virtual reality devices may become disoriented or confused if aspects of the digital environments are unexpected or unusual, and such users may also become frustrated if interactions with aspects of the digital environments are cumbersome or unnatural. Accordingly, there is a need for virtual reality user interfaces that provide information in a clear and organized manner, and also facilitate simple and intuitive interactions by users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 1B-1D are schematic diagrams of example aspects and views of a virtual reality user interface, according to implementations.

Figure 1A:
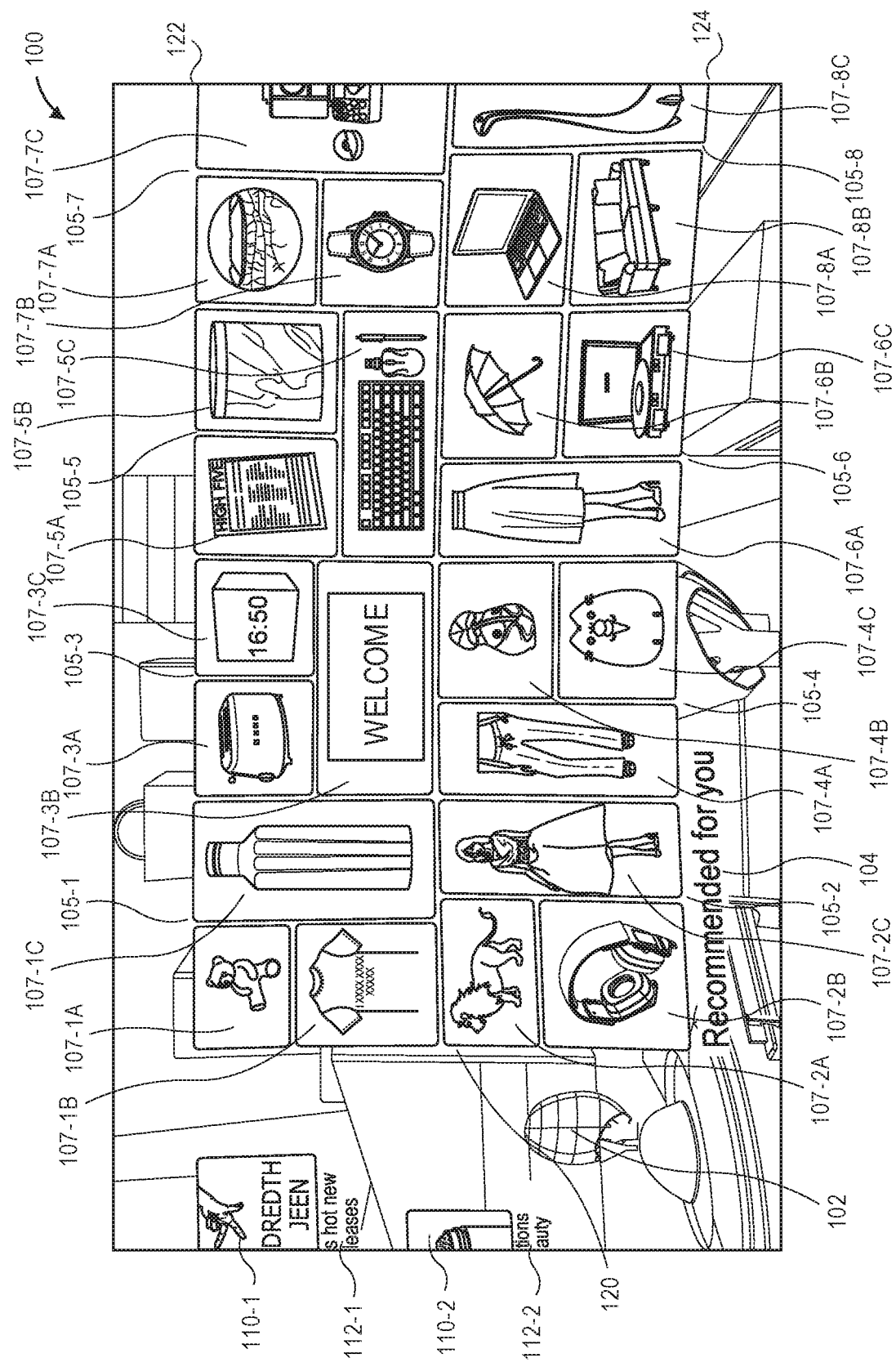
FIG. 1A is a schematic diagram of a first example view of a virtual reality user interface, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods for the generation of virtual reality user interfaces and interactions therewith are described. For example, the virtual reality user interfaces described herein may include a three-dimensional model (or a two-dimensional image) of a background scene or environment, a plurality of cells that are divided into a plurality of subcells, and one or more images included in each of the subcells.

The three-dimensional model that simulates a background environment may include a model or geometry of an indoor environment, an outdoor environment, or any other environment or setting. In addition, the three-dimensional model may be sized to approximately correspond to a real-world environment. For example, if the three-dimensional model is an indoor environment that simulates a coffee shop, the interior space, walls, windows, doors, tables, chairs, plates, cups, and other elements of the indoor environment may be sized to approximately correspond to a real-world coffee shop from a vantage point of a user viewing the virtual reality environment. As another example, if the three-dimensional model is an outdoor environment that simulates a public park, the outdoor space, fields, paths, fences, gates, trees, plants, and other elements of the outdoor environment may be sized to approximately correspond to a real-world public park from a vantage point of a user viewing the virtual reality environment.

The plurality of cells may include a grid or other arrangements of cells that may overlay at least a portion of the three-dimensional model that simulates the background environment. The plurality of cells may be sized and shaped so as to indicate to a user viewing the virtual reality environment that the plurality of cells are presented closer to the user than the three-dimensional model. For example, the plurality of cells may simulate a depth or distance from a user of approximately eight to twelve feet. In addition, the plurality of cells may also simulate a curvature that at least partially wraps or curves around a position of a user viewing the virtual reality environment. For example, the plurality of cells may be shaped to simulate a curvature with a position of a user being an approximate center point of the simulated curvature.

Each of the plurality of cells may also be divided into a plurality of subcells. For example, a cell may be divided into two, three, four or more subcells. The sizes, e.g., aspect ratios, of the subcells may be determined based at least in part on sizes, e.g., aspect ratios, of respective images to be included within each subcell. As an example, if an image of a long or tall item such as a golf club, floor lamp, or a pair of pants is to be included in a subcell, the subcell may be sized with an aspect ratio to accommodate the image of the long or tall item. As another example, if an image of a square or small item such as a toaster, baseball, or a pair of shoes is to be included in a subcell, the subcell may be sized with an aspect ratio to accommodate the image of the square or small item.

Because the sizes of the subcells are determined based at least in part on sizes of respective images included in each subcell, the plurality of subcells may include a variety of sizes side-by-side, i.e., the plurality of subcells may not have uniform sizes. Such variation in sizes of the subcells may increase and/or maintain user interest in the virtual reality user interface, as compared to user interface designs having user interface elements with substantially uniform sizes.

The virtual reality user interfaces described herein may also include one or more supplemental cells. For example, the supplemental cells may represent a collection of items and may be placed around the plurality of cells and subcells, e.g., to the left, to the right, above, or below the plurality of cells and subcells. In addition, one or more of the plurality of cells may also be replaced by one or more supplemental cells, rather than being divided into a plurality of subcells. By the placement of one or more supplemental cells around the plurality of cells and subcells, or even within one or more of the plurality of cells, user interest in the virtual reality user interface may be further increased and/or maintained.

When viewing the virtual reality user interfaces described herein, a user may have various options for manipulating, modifying, replacing, or otherwise interacting with the user interfaces. For example, with the use of a virtual reality device, e.g., a headset, a user may turn his/her head left or right to change a horizontal orientation of a virtual camera within a virtual environment and view additional cells or subcells that simulate a curvature around a position of the user. In addition, a user may raise or lower his/her head to change a vertical orientation of a virtual camera within a virtual environment to view cells or details above or below the plurality of cells and subcells. Further, combinations of horizontal and vertical head movements to change both horizontal and vertical orientations of a virtual camera within a virtual environment are also possible.

With the use of a controller having one or more input elements together with a virtual reality device, e.g., a headset, a user may have further options for manipulating, modifying, replacing, or otherwise interacting with the user interfaces. For example, by swiping left or right on an input element of the controller, a user may be able to scroll left or right to view additional cells or subcells. In addition, by swiping down or up on an input element of the controller, a user may be able to zoom in or zoom out to view additional or fewer details of the cells or subcells.

Further, by single clicking a cell or subcell via an input element of the controller, a user may be able to view additional details associated with an item represented by the cell or subcell. For example, the additional details may include price, popularity, customer reviews, an option to indicate interest in an item, an option to add the item to an electronic shopping cart, an option to view details related to the item, an option to view items related to the item, or an option to purchase the item. In addition, by double clicking a cell or subcell via an input element of the controller, a user may be able to indicate interest in an item without first viewing additional details of the item, or take various other desired actions.

Moreover, by clicking, holding, moving, and releasing a subcell via an input element of the controller, a user may be able to remove the subcell from the plurality of cells and place the subcell at a new position. For example, the removed and placed subcell may appear larger, e.g., closer to the user, and may also include additional details. In addition, by again clicking, holding, and pulling the removed and placed subcell via the input element of the controller, the user may be able to replace the plurality of cells and subcells with the selected subcell. For example, the entire virtual reality user interface may be replaced with the enlarged subcell having a simulated depth and simulated curvature, and the enlarged subcell may include even more details and options associated with the item.

Furthermore, by clicking, holding, moving, and releasing a supplemental cell that represents a collection of items via an input element of the controller, a user may be able to remove the supplemental cell from the plurality of cells and place the supplemental cell at a new position. For example, the removed and placed supplemental cell may appear larger, e.g., closer to the user, and may expand to include additional cells that may also divide into a plurality of subcells. In addition, by again clicking, holding, and pulling the removed and placed supplemental cell via the input element of the controller, the user may be able to replace the plurality of cells and subcells with the selected supplemental cell including additional cells and respective pluralities of subcells. For example, the entire virtual reality user interface may be replaced with the enlarged supplemental cell having a simulated depth and simulated curvature, and the enlarged supplemental cell may include even more cells that may be divided into a plurality of subcells.

In addition to head movements and inputs received via input elements of a controller, various voice inputs may also be received by the virtual reality systems described herein to control various aspects and interactions with the systems. For example, a search for a particular item or type of item may be initiated via a voice input, and the virtual reality user interfaces described herein may be generated based at least in part on the voice input. Other interactions with the virtual reality user interfaces described herein may include voice inputs related to scrolling, panning, or zooming the interfaces, selecting a cell or subcell, indicating an interest in an item, viewing related items, adding items to an electronic shopping cart, purchasing an item, viewing additional details of an item, or any other interactions with the virtual reality user interfaces described herein.

The virtual reality user interfaces described herein may improve the ability of a computer or computing device to display information and facilitate interactions therewith by a user via a virtual reality device, a controller, voice inputs, or other inputs. The claims of this application may solve problems of prior graphical user interfaces in the context of item searching, browsing, and/or purchasing related to speed, accuracy, relevance, usability, and/or content suitability (e.g., parental controls), and may also eliminate any doubts that a user may have related to discovering, identifying, and/or purchasing an item, e.g., through the use of customer reviews, indications of interest, identifications or recommendations of related items, indications of other customers' searching, browsing, and/or purchasing behaviors, and others.

As described herein, according to example embodiments, the user interfaces may present a section detailing a three-dimensional model that simulates a background environment, a section detailing a plurality of cells and subcells that may identify items, a section detailing one or more supplemental cells that may identify collections of items, search filters, previously viewed items, or other groups of items, a section detailing selectable options related to cells or subcells, a section detailing previews of cells or subcells, a section detailing item detail pages, and other sections. Furthermore, various of these sections may overlay at least portions of various other sections, thereby allowing display of information clearly to a user within a limited field of view while also facilitating interactions therewith by a user. This particular arrangement and combination of sections may allow users to more efficiently and accurately make purchasing decisions when searching, browsing, and/or contemplating completing a purchase, rental, or other acquisition of an item. As such, the user interfaces described herein may improve the ability of the computer or computing device to display information and facilitate interactions therewith by a user.

FIG. 1A is a schematic diagram of a first example view 100 of a virtual reality user interface, according to an implementation.

The first example view 100 includes a three-dimensional model 102 that simulates a background environment, e.g., an outdoor scene or environment. The three-dimensional model 102 may be formed of a plurality of three-dimensional mesh objects or elements, e.g., JSON files, X3D files, VRML files, or other 3-D mesh object file types, that together simulate a background scene or environment, e.g., an urban environment including buildings, streets, sidewalks, trees, vehicles, or other objects. In addition, the three-dimensional model 102 may be sized to approximately correspond to a real-world scene or environment from a vantage point of a user. In addition, the three-dimensional model 102 may simulate a default scene or environment, and/or may be selected based at least in part on user preferences, user input, user selection, search queries, currently viewed items, viewing history, purchasing history, or any other factors. For example, a search query for a particular type or category of items may be associated with one or more three-dimensional models 102 or portions thereof that include a particular scene or environment. Alternatively, a three-dimensional model 102 or a portion thereof may be selected at random, without regard to user preferences, user input, or any other factors.

Overlaid over at least a portion of the three-dimensional model 102 may be a plurality of cells 105 having a corresponding label or identifier 104. In the example of FIG. 1A, the label 104 is "Recommended For You," which may be based on user preferences, inputs, queries, viewing history, purchasing history, or any other factors. In other embodiments, the label 104 may relate to a user's search query, e.g., a search query to view "walking shoes," user input, e.g., a selection to view more items like a particular shoe displayed for the user, user selection of a particular item, viewing history, purchasing history, wishlists, electronic cart lists, or other lists, or other inputs or selections. Although FIG. 1A shows a plurality of cells 105 including eight cells 105-1, 105-2, 105-3, 105-4, 105-5, 105-6, 105-7, 105-8 in a grid pattern having a corresponding label 104, any other number or arrangement of cells 105 with or without labels 104 may also be overlaid over at least a portion of the three-dimensional model 102.

Each of the plurality of cells 105 may also be divided into a plurality of subcells 107. For example, cell 105-1 is divided into subcells 107-1A, 107-1B, 107-1C, cell 105-2 is divided into subcells 107-2A, 107-2B, 107-2C, cell 105-3 is divided into subcells 107-3A, 107-3B, 107-3C, cell 105-4 is divided into subcells 107-4A, 107-4B, 107-4C, cell 105-5 is divided into subcells 107-5A, 107-5B, 107-5C, cell 105-6 is divided into subcells 107-6A, 107-6B, 107-6C, cell 105-7 is divided into subcells 107-7A, 107-7B, 107-7C, and cell 105-8 is divided into subcells 107-8A, 107-8B, 107-8C. Although each of the cells 105 shown in FIG. 1A is divided into three subcells 107, each of the cells 105 may be divided into any other number of subcells 107, e.g., two, three, four, or more subcells, or maintained as a single subcell 107 that corresponds to the entire size of a cell 105.

Each of the plurality of subcells 107 may be sized based at least in part on a respective image included in each subcell 107. For example, based at least in part on an aspect ratio of an image to be included in a subcell 107, the subcell 107 may be sized to have an approximately corresponding aspect ratio as the respective image. For example, tall or long items may be placed within subcells having corresponding aspect ratios, and square or small items may be placed within subcells having corresponding aspect ratios. Further, one or more of the images to be included in respective subcells 107 may also comprise videos or other moving images. Based at least in part on the aspect ratios of a plurality of images to be included in a plurality of subcells 107, the plurality of cells 105 may be divided into subcells 107 to accommodate at least some of the plurality of images. Because the subcells 107 are sized based at least in part on aspect ratios of images to be included therein, each cell 105 may be divided into a different number and different sizes of subcells 107 relative to a number and sizes of subcells 107 of any other cells 105.

In addition, images having similar aspect ratios may be grouped, e.g., long or tall images may be grouped, and/or square or small images may also be grouped. Then, images having similar aspect ratios may be selected for, placed in, or assigned to adjacent subcells 107 within cells 105, such that each cell 105 may be divided into subcells 107 without creating excess empty space or gaps between subcells 107 of a cell 105. For example, as shown in FIG. 1A, subcells 107-3A and 107-3C may include images having similar aspect ratios, and thus, may be selected for placement in adjacent subcells 107 within cell 105-3, thereby minimizing any empty space or gaps between subcells 107 of the cell 105. In addition or alternatively, images having aspect ratios that may together substantially fill the available space within a cell 105 may be grouped, even if none of the images in the group shares a similar aspect ratio, such that each cell 105 may be divided into subcells 107 without creating excess empty space or gaps between subcells 107 of a cell 105. For example, as shown in FIG. 1A, subcells 107-1A, 107-1B, and 107-1C may include images having disparate aspect ratios that may nevertheless be grouped together to substantially fill the available space within cell 105-1, and thus, may be selected for placement in adjacent subcells 107 within cell 105-1, thereby minimizing any empty space or gaps between subcells 107 of the cell 105.

In some embodiments, a plurality of adjacent subcells, e.g., from within the same cell or from one or more adjacent cells, may include images of related items. Additionally, the related items of adjacent subcells may also be offered to users as bundles or groups of items, e.g., a phone, a phone case, and a phone charging cord, or an outfit including a pair of pants, a shirt, socks, and shoes. In such embodiments, the bundling of related items in adjacent subcells may also be visually indicated or emphasized to a user, e.g., via highlighting or encircling of the adjacent subcells, or via any other visual indications.

In other embodiments, a user may be allowed to select or configure, e.g., via user input or user preferences, a size of one or more cells, subcells, images, and/or text or labels associated with any of the cells, subcells, or images. Such user selection or configuration may be received by various mechanisms, including a slider bar, text input field, controller inputs, voice inputs, or other inputs. In still other embodiments, a user may be allowed to select or configure a total number of cells or subcells to be rendered within a field of view of a user, e.g., 10 cells, 25 cells, or any other number of cells or subcells. Then, the plurality cells and subcells may be generated, divided, and rendered within a field of view of the user based at least in part on such user selections or configurations.

In still further embodiments, an image to be included in a subcell may be selected based at least in part on information received from a seller, vendor, or other entity associated with an item represented in the image. For example, a seller may designate a particular image of an item as a primary image to be included in a subcell for the item, a seller may designate a particular aspect ratio to be associated with an image, and/or a seller may designate a minimum size of a subcell within which the image may be included, e.g., to ensure that the subcell is large enough to adequately convey a desired level of detail of the item. In addition, in other embodiments, a primary image for an item may be selected based at least in part on comments, reviews, and/or feedback from users related to an item and/or an image, e.g., an indication by other users that a particular image showed a desired level of detail.

Further, in some embodiments, one or more cells or subcells may be at least partially masked or obfuscated. For example, rather than immediately rendering and displaying to a user an image of an item within a subcell, a graphic, animation, and/or text that may indicate a special offer, a limited-time deal, or other attention-grabbing message may be displayed. Then, in order for the user to view the item associated with the deal or offer, further user action may be required, such as entry of a special code, or particular motions or actions such as virtually scratching away, peeling off, or removing the obfuscating graphic, animation, and/or text, via any of the input methods described herein.

Further, the plurality of cells 105 and plurality of subcells 107 may visually begin at a home position 120 approximately in front of an initial field of view of the user. As shown in FIG. 1A, the home position 120 may be considered to be at approximately 0 degrees relative to the user, and the field of view of the user may be rotated, e.g., by head movements left or right, up to approximately 360 degrees or more around the position of the user in either rotational direction. The home position 120 may be automatically determined at startup of the virtual reality device, e.g., based on an initial position and/or orientation of the device. In addition, a user may change or redefine the home position 120 while using the virtual reality device, e.g., via one or more inputs received via the virtual reality device, a controller, or a voice input. Moreover, the plurality of cells 105 and plurality of subcells 107 may visually end at an end position at approximately 170 degrees relative to the user, e.g., starting from the home position 120 at approximately 0 degrees and rotating to the right around the position of the user approximately 170 degrees. For example, the end position at approximately 170 degrees relative to the user may be visually indicated by a fading out, dematerializing, and/or scattering of the plurality of cells 105 and subcells 107 approximately at the end position.

Further, items represented by images in subcells 107 near or close to the home position 120 may generally be more relevant to user preferences, user input, user selection, search queries, or other factors associated with the user interface currently rendered for presentation to the user. Likewise, items represented by images in subcells 107 farther from the home position 120, e.g., toward, near, or beyond an end position at approximately 170 degrees relative to the user, may generally be less relevant to user preferences, user input, user selection, search queries, or other factors associated with the user interface currently rendered for presentation to the user. Alternatively or in addition, at least a portion of more relevant items may intentionally be placed in subcells 107 interspersed throughout the user interface, and not just close to the home position, in order to encourage users to view additional portions of the user interface. Moreover, if a user is viewing the last of the relevant search results for a particular search query, for example, the ends of the plurality of cells 105 and subcells 107 may be shown as solid cells, without any visual effects such as fading out, dematerializing, and/or scattering, and the plurality of cells 105 and subcells 107 may bounce, wiggle, or otherwise visually indicate that the user has reached the end of the relevant search results.

In addition, the plurality of cells 105 and plurality of subcells 107 may have a simulated depth from a position of the user, or between a position of the user and the three-dimensional model 102 that simulates a background environment. In some embodiments, the simulated depth may be defined as an amount or number of units forward from a position of a user, which may be described in terms of Cartesian coordinates within a three-dimensional model of an environment. For example, the simulated depth may be approximately eight feet (approximately 2.4 meters) to approximately twelve feet (approximately 3.6 meters) in front of a position of the user. In addition, a perceived depth of the plurality of cells and subcells within a field of view of a user may approximately correspond to the simulated depth. Further, the plurality of cells 105 and the plurality of subcells 107 may have a simulated curvature around a position of the user. For example, the cells 105 and subcells 107 may appear to extend or wrap around a position of the user. In addition, a perceived curvature of the plurality of cells and subcells within a field of view of a user may approximately correspond to the simulated curvature.

As shown in FIG. 1A, the simulated curvature may be visually created by upper edges 122 of the cells 105 and subcells 107, lower edges 124 of the cells 105 and subcells 107, and/or the shapes of the cells 105 and subcells 107. For example, in some embodiments, the upper edges 122 may form a substantially straight horizontal line, and the lower edges 124 may form a curved or arcuate line. In other embodiments, the upper edges 122 and the lower edges 124 may each form curved or arcuate lines to indicate the simulated curvature, and the upper edges 122 and the lower edges 124 may form curved lines that are the same as or different from each other. Moreover, the curved lines formed by either the upper edges 122 or the lower edges 124 may be convex or concave relative to a center of the user interface, as further described herein with respect to FIGS. 1B-1D. In addition, the shapes of the cells 105 and subcells 107 may also visually indicate the simulated curvature.

Further, the curved lines formed by the upper edges 122 and/or the lower edges 124 may appear to change from the perspective of a user viewing the cells 105 and subcells 107 depending upon a particular viewpoint of the user. For example, when viewing the cells 105 and subcells 107 from a relatively higher viewpoint, the upper and lower edges 122, 124 may each form respective first curved lines, and when viewing the same cells 105 and subcells 107 from a relatively lower viewpoint, the upper and lower edges 122, 124 may each form respective second curved lines that may be different from the respective first curved lines.

Further, to the left of the home position 120 up to approximately −30 degrees relative to the user, e.g., starting from the home position 120 at approximately 0 degrees and rotating to the left around the position of the user approximately 30 degrees, one or more supplemental cells 110 having corresponding labels 112 may be included in the virtual reality user interface. Although FIG. 1A shows two supplemental cells 110-1, 110-2 having corresponding labels 112-1, 112-2, any other number or arrangement of supplemental cells 110 may be included.

FIGS. 1B-1D are schematic diagrams of example aspects and views 100B, 100C, 100D of a virtual reality user interface, according to implementations.

Referring to FIG. 1B, the upper diagram of FIG. 1B illustrates a schematic overhead view of a user viewing a virtual reality user interface. The user may be located at user position 130 having a field of view 132 of the virtual reality user interface that is represented by the curved line and that may display cells 105 and subcells 107. The field of view 132 may be between approximately 45 degrees and approximately 135 degrees, and more particularly, the field of view 132 may be between approximately 70 degrees and approximately 110 degrees.

As shown in FIG. 1B, the virtual reality user interface may also have a simulated depth 134 and a simulated curvature that is represented by radius of curvature 136 around a center point 138. For example, the simulated depth 134 may be between approximately eight feet and approximately twelve feet. In addition, in the example shown in FIG. 1B, the simulated curvature may have a radius of curvature 136 that is the same as the simulated depth 134, such that the center point 138 of the radius of curvature is aligned with the user position 130.

Referring now to the lower diagram of FIG. 1B, the combination of user position 130, field of view 132, simulated depth 134, and/or simulated curvature 136 shown in the upper diagram of FIG. 1B may result in an example view 100B. For example, the example view 100B may include upper edges 122 that may form a horizontal line or curved lines that may be convex from a center of the user interface, and lower edges 124 that may form a horizontal line or curved lines that may be concave from a center of the user interface. In addition, as described herein, a plurality of cells and a plurality of subcells, as well as one or more supplemental cells, may be rendered within at least a portion of the example view 100B between the upper edges 122 and the lower edges 124 as shown in the lower diagram of FIG. 1B.

Referring to FIG. 1C, the upper diagram of FIG. 1C illustrates another schematic overhead view of a user viewing a virtual reality user interface. The user may be located at user position 130 having a field of view 132 of the virtual reality user interface that is represented by the curved line and that may display cells 105 and subcells 107. The field of view 132 may be between approximately 45 degrees and approximately 135 degrees, and more particularly, the field of view 132 may be between approximately 70 degrees and approximately 110 degrees.

As shown in FIG. 1C, the virtual reality user interface may also have a simulated depth 134 and a simulated curvature that is represented by radius of curvature 136 around a center point 138. For example, the simulated depth 134 may be between approximately eight feet and approximately twelve feet. In addition, in the example shown in FIG. 1C, the simulated curvature may have a radius of curvature 136 that is larger than the simulated depth 134, such that the center point 138 of the radius of curvature is at a greater distance from the user interface than the user position 130.

Referring now to the lower diagram of FIG. 1C, the combination of user position 130, field of view 132, simulated depth 134, and/or simulated curvature 136 shown in the upper diagram of FIG. 1C may result in an example view 100C. For example, the example view 100C may include upper edges 122 that may form curved lines that may be convex from a center of the user interface, and lower edges 124 that may also form curved lines that may be convex from a center of the user interface. In addition, as described herein, a plurality of cells and a plurality of subcells, as well as one or more supplemental cells, may be rendered within at least a portion of the example view 100C between the upper edges 122 and the lower edges 124 as shown in the lower diagram of FIG. 1C.

Referring to FIG. 1D, the upper diagram of FIG. 1D illustrates yet another schematic overhead view of a user viewing a virtual reality user interface. The user may be located at user position 130 having a field of view 132 of the virtual reality user interface that is represented by the curved line and that may display cells 105 and subcells 107. The field of view 132 may be between approximately 45 degrees and approximately 135 degrees, and more particularly, the field of view 132 may be between approximately 70 degrees and approximately 110 degrees.

As shown in FIG. 1D, the virtual reality user interface may also have a simulated depth 134 and a simulated curvature that is represented by radius of curvature 136 around a center point 138. For example, the simulated depth 134 may be between approximately eight feet and approximately twelve feet. In addition, in the example shown in FIG. 1D, the simulated curvature may have a radius of curvature 136 that is smaller than the simulated depth 134, such that the center point 138 of the radius of curvature is at a smaller distance from the user interface than the user position 130.

Referring now to the lower diagram of FIG. 1D, the combination of user position 130, field of view 132, simulated depth 134, and/or simulated curvature 136 shown in the upper diagram of FIG. 1D may result in an example view 100D. For example, the example view 100D may include upper edges 122 that may form curved lines that may be concave from a center of the user interface, and lower edges 124 that may also form curved lines that may be concave from a center of the user interface. In addition, as described herein, a plurality of cells and a plurality of subcells, as well as one or more supplemental cells, may be rendered within at least a portion of the example view 100D between the upper edges 122 and the lower edges 124 as shown in the lower diagram of FIG. 1D.

Although FIGS. 1B-1D illustrate particular combinations of user positions, fields of view, simulated depths, and/or simulated curvatures that may result in particular example views of the user interface, other combinations of the example aspects described herein are also possible that may result in example views of the user interface other than those that are illustrated. In addition, although FIGS. 1B-1D show and describe the simulated curvatures with respect to radii of curvature from a center point, other example simulated curvatures may not have constant radii of curvature from a center point, e.g., an example simulated curvature may be defined by an ellipse or a portion thereof, or any other arc or curve that does not have a constant radius of curvature from a center point.

Figure 2:
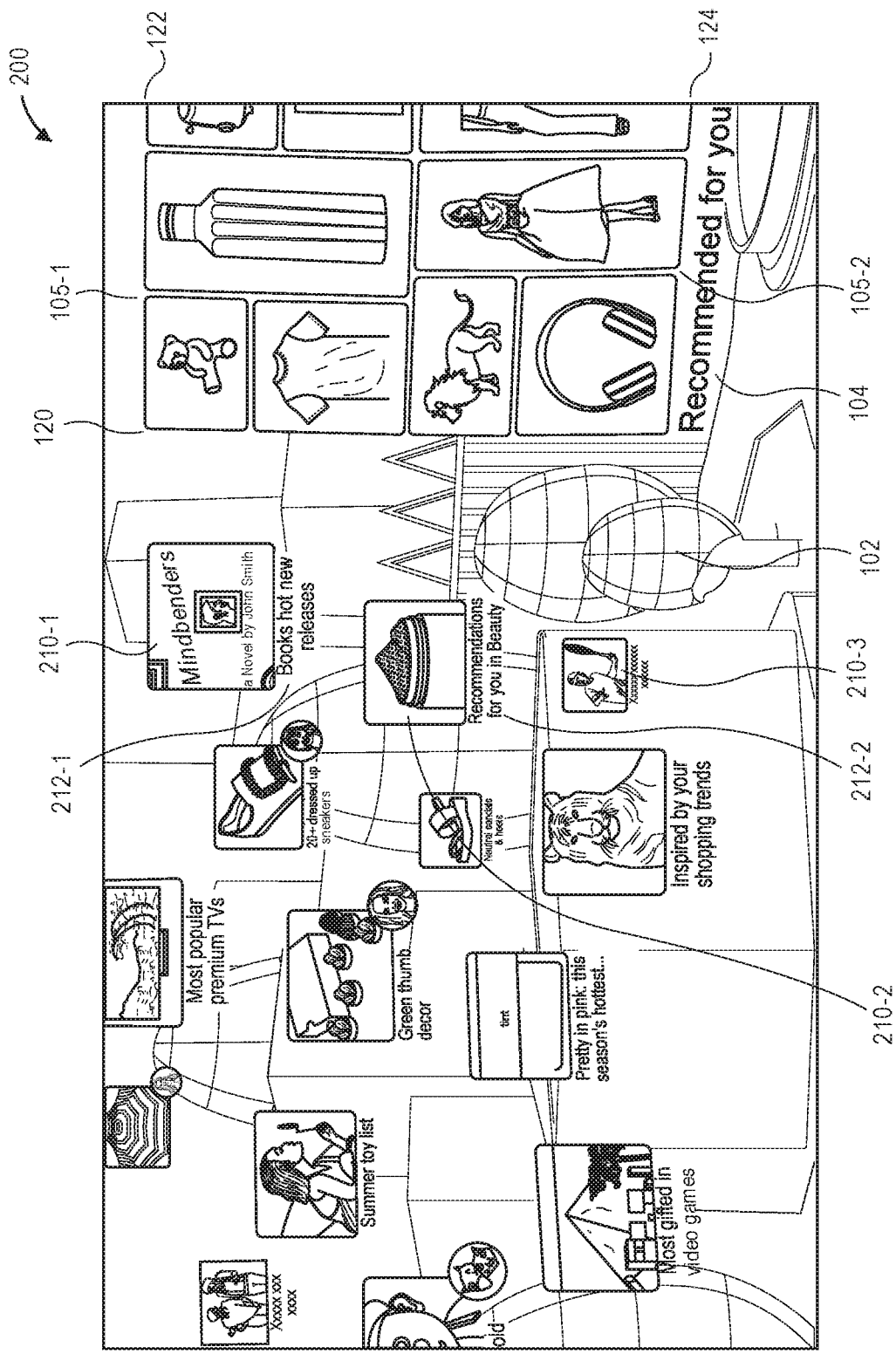
FIG. 2 is a schematic diagram of a second example view of a virtual reality user interface, according to an implementation.

FIG. 2 is a schematic diagram of a second example view 200 of a virtual reality user interface, according to an implementation.

As shown in FIG. 2, the virtual reality user interface may include any number and arrangement of supplemental cells 210 to the left of the home position 120 and may extend or wrap around approximately 30 degrees to the left of the position of the user. The supplemental cells 210 may each also overlay at least a portion of the three-dimensional model 102 to the left of the plurality of cells 105 and plurality of subcells 107. The supplemental cells 210 may relate to items or collections of items based at least in part on popularity, customer reviews, promotions, user preferences, user input, user selection, search queries, currently viewed items, viewing history, purchasing history, or any other factors. Although FIG. 2 shows a particular number and arrangement of supplemental cells 210-1, 210-2 having corresponding labels 212-1, 212-2, any other number or arrangement of supplemental cells 210 with or without corresponding labels 212 may be included.

In addition, each of the supplemental cells 210 may have a simulated depth from a position of the user, or between a position of the user and the three-dimensional model 102 that simulates a background environment. For example, the simulated depth may be approximately eight feet to approximately twelve feet in front of a position of the user. Further, the supplemental cells 210 may also have a simulated curvature around a position of the user. For example, the supplemental cells 210 may appear to extend or wrap around a position of the user based at least in part on the shapes of each of the supplemental cells 210.

Further, each of the supplemental cells 210 may represent an item or a collection of items. In example embodiments in which a supplemental cell 210 represents a collection of items, a respective image within the supplemental cell 210 and/or a corresponding label 212 may indicate to the user that the supplemental cell 210 represents a collection of items rather than only a single item, e.g., "most popular premium TVs," "most gifted in video games," etc. Further, one or more of the images to be included in respective supplemental cells 210 may also comprise videos or other moving images. In addition, as shown in FIG. 2, one or more of the supplemental cells 210 may be user-created or user-curated collections of items, and a user-created supplemental cell 210 may include an indication of a user who created the collection of items, e.g., an image or identifier associated with a user such as a picture, avatar, or other identifier that is rendered together with the supplemental cell 210, such as circular images shown at the lower right corners of some of the supplemental cells 210 in FIG. 2. As further described herein, an interaction by a user with a supplemental cell 210 representing a collection of items may cause an expansion of the supplemental cell 210 to at least partially reveal the collection of items.

In addition, collections of items represented by images in supplemental cells 210 near or close to the home position 120 may generally be more relevant to user preferences, user input, user selection, search queries, or other factors associated with the user interface currently rendered for presentation to the user. Likewise, collections of items represented by images in supplemental cells 210 farther from the home position 120, e.g., toward, near, or beyond a position at approximately −30 degrees relative to the user, may generally be less relevant to user preferences, user input, user selection, search queries, or other factors associated with the user interface currently rendered for presentation to the user. Alternatively or in addition, at least a portion of more relevant items may intentionally be placed in supplemental cells 210 interspersed throughout the user interface, and not just close to the home position, in order to encourage users to view additional portions of the user interface.

Moreover, one or more of the supplemental cells 210 may also represent filters that may be applied to items currently displayed in the virtual reality user interface. For example, items may be currently displayed based on a search query provided by a user, and one or more of the supplemental cells 210 may indicate one or more search filters that may be applied to such currently displayed items, such as search filters related to price, size, color, other item characteristics, popularity, customer rating, availability, shipping methods, or any other applicable filters. As further described herein, an interaction by a user with a supplemental cell 210 representing a filter may cause an expansion of the supplemental cell 210 to at least partially reveal the filtered set of items.

Furthermore, one or more of the supplemental cells 210 may also represent virtual reality user interfaces previously displayed based on search queries or other user input, e.g., similar to a "back" button on a web browser, that may be selected to return to one or more previously viewed virtual reality user interfaces. For example, a supplemental cell 210 situated closest to the home position 120 of the currently displayed virtual reality user interface may correspond to a virtual reality user interface that a user had viewed immediately prior to the currently displayed virtual reality user interface. As further described herein, an interaction by a user with a supplemental cell 210 representing a previously displayed virtual reality user interface may cause an expansion of the supplemental cell 210 to at least partially reveal the previously displayed virtual reality user interface.

Figure 3:
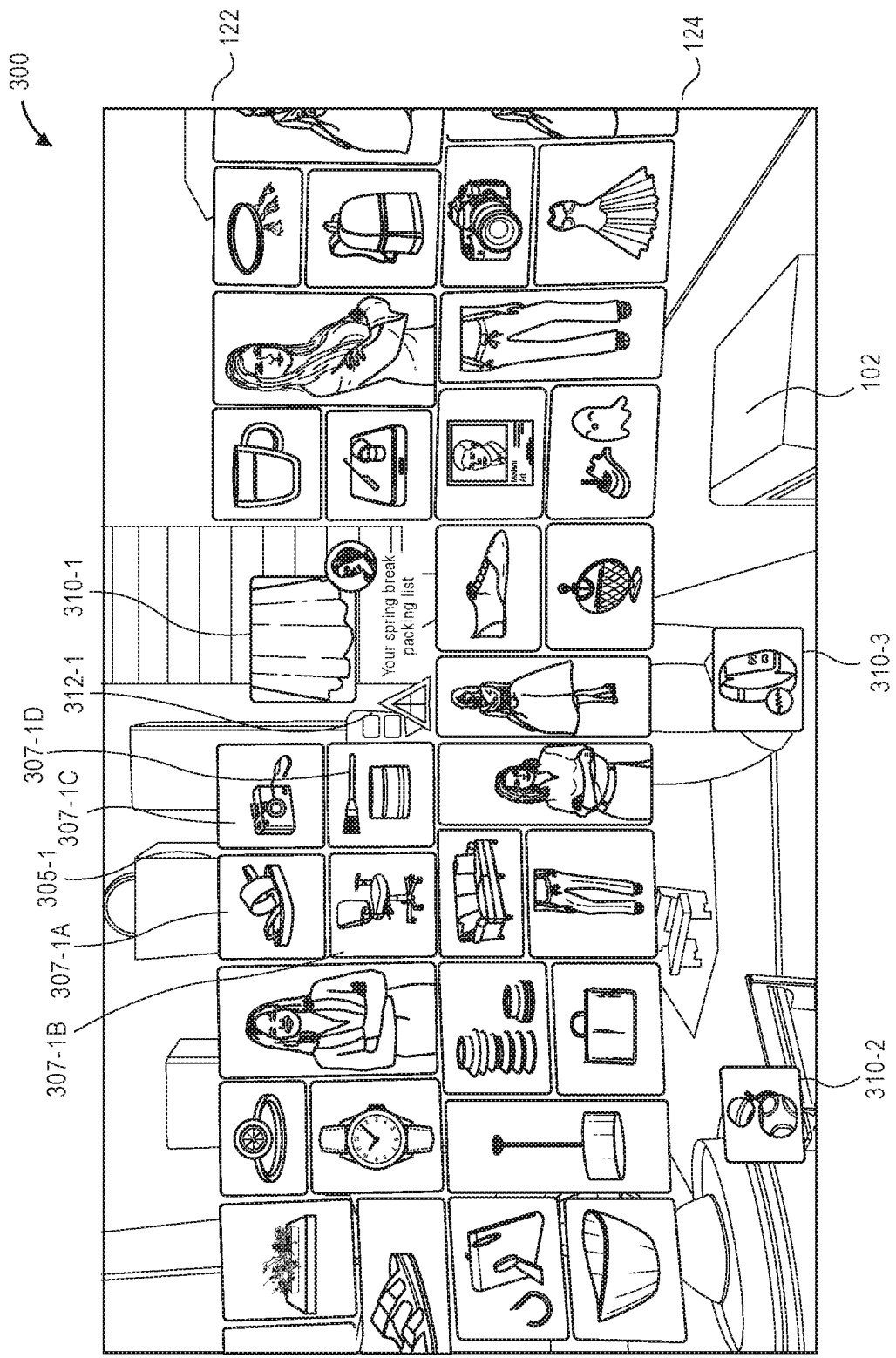
FIG. 3 is a schematic diagram of a third example view of a virtual reality user interface, according to an implementation.

FIG. 3 is a schematic diagram of a third example view 300 of a virtual reality user interface, according to an implementation.

FIG. 3 shows a portion of the virtual reality user interface that extends to the right of the home position 120 described with respect to FIG. 1A. The virtual reality user interface may include a plurality of cells 305 and plurality of subcells 307 overlaid over at least a portion of the three-dimensional model 102. For example, as shown in FIG. 3, one cell 305-1 is divided into four subcells 307-1A, 307-1B, 307-1C, 307-1D. Other cells 305 may be divided into other numbers of subcells 307.

In addition, FIG. 3 shows three example supplemental cells 310-1, 310-2, 310-3 within the third example view 300. The supplemental cell 310-1 may include a corresponding label 312-1, e.g., "your spring break packing list." Further, the supplemental cell 310-1 may replace one or more cells 305 or one or more subcells 307, and may also have a simulated depth and simulated curvature similar to the plurality of cells and subcells. In addition to the variable sizes of the subcells 307 within the virtual reality user interface, the replacement of cells or subcells with supplemental cells 310 may also increase and/or maintain user interest in the user interface.

Further, the supplemental cells 310-2, 310-3 may be placed below the plurality of cells 305 and plurality of subcells 307. The supplemental cells 310-2, 310-3 may also have a simulated depth and simulated curvature similar to the plurality of cells and subcells. In addition, the supplemental cells 310-2, 310-3 may appear to move or rotate around the position of the user together with the plurality of cells and subcells. Further, one or more of the images to be included in respective supplemental cells 310 may also comprise videos or other moving images. Although FIG. 3 shows supplemental cells 310 placed below the plurality of cells and subcells, supplemental cells 310 may also or alternatively be placed above the plurality of cells and subcells. The addition of supplemental cells 310 above and/or below the plurality of cells and subcells may further increase and/or maintain user interest in the user interface.

In addition, collections of items represented by images in supplemental cells 310 near or close to the home position 120 may generally be more relevant to user preferences, user input, user selection, search queries, or other factors associated with the user interface currently rendered for presentation to the user. Likewise, collections of items represented by images in supplemental cells 310 farther from the home position 120, e.g., toward, near, or beyond an end position at approximately 170 degrees relative to the user, may generally be less relevant to user preferences, user input, user selection, search queries, or other factors associated with the user interface currently rendered for presentation to the user. Alternatively or in addition, at least a portion of more relevant items may intentionally be placed in supplemental cells 310 interspersed throughout the user interface, and not just close to the home position, in order to encourage users to view additional portions of the user interface.

Moreover, one or more of the supplemental cells 310 may also represent filters that may be applied to items currently displayed in the virtual reality user interface. For example, items may be currently displayed based on a search query provided by a user, and one or more of the supplemental cells 310 may indicate one or more search filters that may be applied to such currently displayed items, such as search filters related to price, size, color, other item characteristics, popularity, customer rating, availability, shipping methods, or any other applicable filters. As further described herein, an interaction by a user with a supplemental cell 310 representing a filter may cause an expansion of the supplemental cell 310 to at least partially reveal the filtered set of items.

Furthermore, one or more of the supplemental cells 310 may also represent virtual reality user interfaces previously displayed based on search queries or other user input, e.g., similar to a "back" button on a web browser, that may be selected to return to one or more previously viewed virtual reality user interfaces. For example, a supplemental cell 310 situated within, above, and/or below the currently displayed virtual reality user interface may correspond to a virtual reality user interface that a user had viewed immediately prior to the currently displayed virtual reality user interface. As further described herein, an interaction by a user with a supplemental cell 310 representing a previously displayed virtual reality user interface may cause an expansion of the supplemental cell 310 to at least partially reveal the previously displayed virtual reality user interface.

In addition, although not illustrated in FIG. 3, additional selectable options may be displayed below the supplemental cells 310 that are below the currently displayed virtual reality user interface, which may be viewable by a user rotating his/her head downward. For example, the additional selectable options may include a "home" option, a "search" option, a "my account" option, a "my products" option, or other options. For example, the "home" option may return a user to an initial launch screen when starting an application or service that renders the virtual reality user interfaces described herein. In addition, the "search" option may allow a user to enter a new search query via voice, text, or other input. Further, the "my account" and "my products" options may allow a user to view aspects, settings, preferences, items, or details related to an account of the user or previously viewed, liked, or purchased items. Moreover, other selectable options may also be available to the user.

Figure 4:
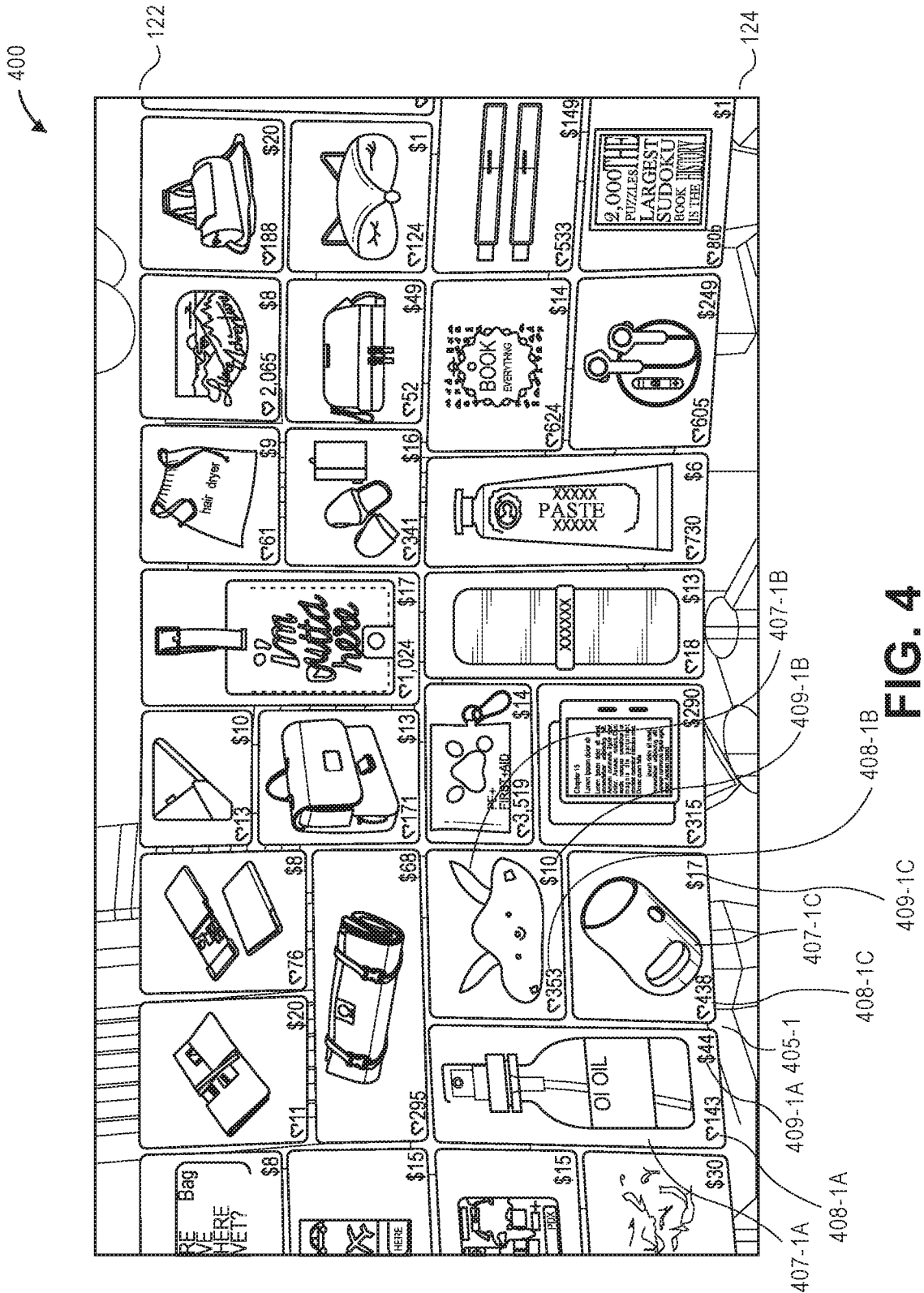
FIG. 4 is a schematic diagram of a fourth example view of a virtual reality user interface, according to an implementation.

FIG. 4 is a schematic diagram of a fourth example view 400 of a virtual reality user interface, according to an implementation.

FIG. 4 shows a portion of the virtual reality user interface that extends to the right of the home position 120 described with respect to FIG. 1A and with an increased level of zoom, e.g., visually appearing closer to a position of the user. The virtual reality user interface may include a plurality of cells 405 and plurality of subcells 407 overlaid over at least a portion of the three-dimensional model 102. For example, as shown in FIG. 4, one cell 405-1 is divided into three subcells 407-1A, 407-1B, 407-1C. Other cells 405 may be divided into other numbers of subcells 407.

As described herein, the level of zoom of the virtual reality user interface may be changed by various inputs, e.g., via one or more inputs received via the virtual reality device, a controller, or a voice input. One example input to alter a level of zoom may be a vertical swipe motion or gesture received via an input element of a controller in communication with the virtual reality device. As a result of the increased level of zoom as shown in FIG. 4, additional details or information may be included in one or more of the subcells 407. For example, the additional information may include interest or popularity indicators 408, price 409, or any other information. As shown in FIG. 4, each subcell 407-1A, 407-1B, 407-1C includes respective interest indicators 408-1A, 408-1B, 408-1C and prices 409-1A, 409-1B, 409-1C. Other additional details or information may include item details, item availability, shipping information, merchant information, customer ratings or reviews, user input options, or any other details.

Figure 5:
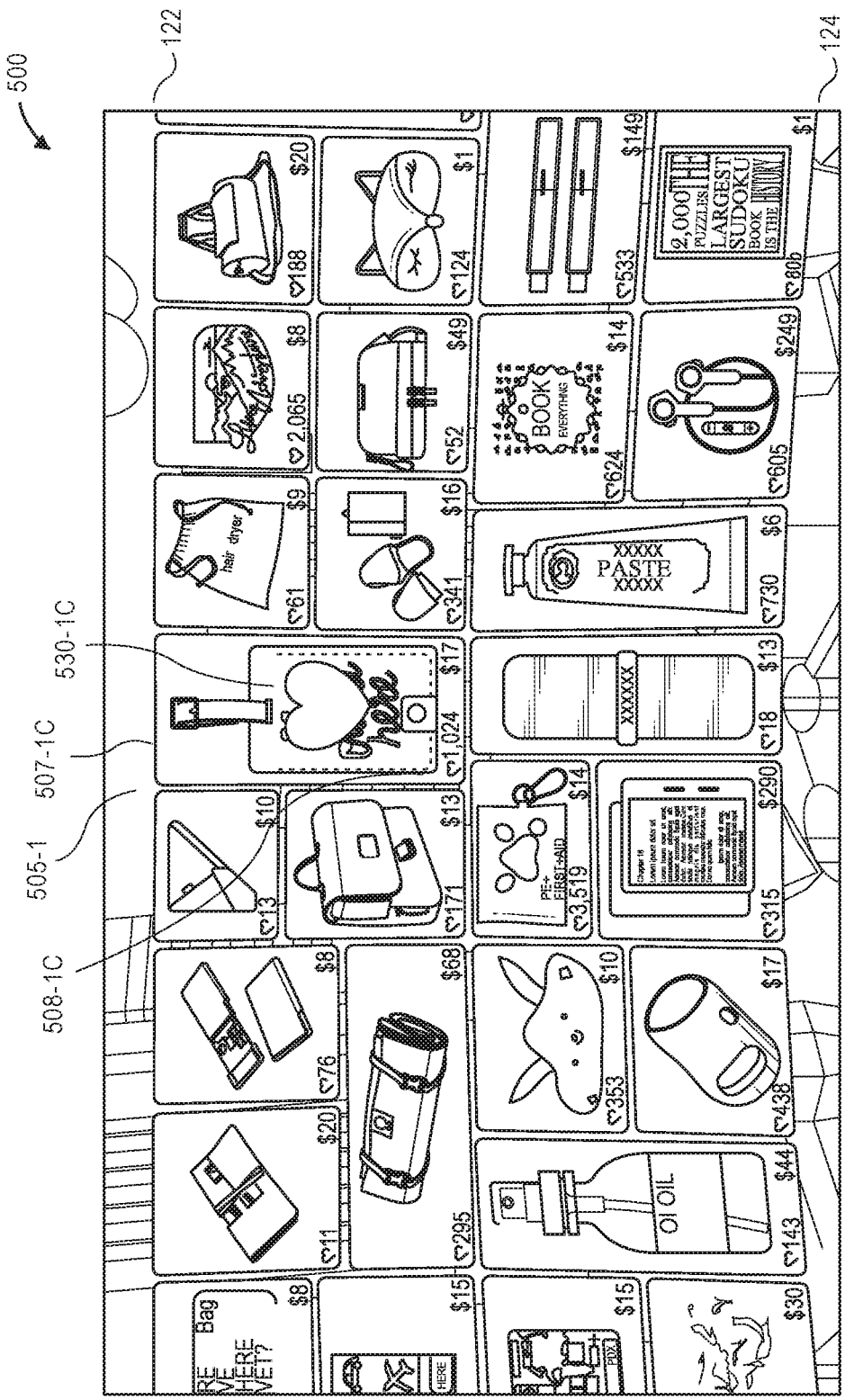
FIG. 5 is a schematic diagram of a fifth example view of a virtual reality user interface, according to an implementation.

FIG. 5 is a schematic diagram of a fifth example view 500 of a virtual reality user interface, according to an implementation.

FIG. 5 shows a portion of the virtual reality user interface that extends to the right of the home position 120 described with respect to FIG. 1A and with an increased level of zoom, e.g., visually appearing closer to a position of the user. The virtual reality user interface may include a plurality of cells 505 and plurality of subcells 507 overlaid over at least a portion of the three-dimensional model 102. For example, as shown in FIG. 5, one cell 505-1 is divided into three subcells including subcell 507-1C having one or more additional details, such as interest indicator 508-1C. Other cells 505 may be divided into other numbers of subcells 507, and other additional details may also be included.

As shown in FIG. 5, a user has indicated an interest in the item represented in subcell 507-1C. For example, an interest in an item represented in the virtual reality user interface may be indicated by various inputs, e.g., via one or more inputs received via the virtual reality device, a controller, or a voice input. One example input may be a double-click of an input element of a controller in communication with the virtual reality device, in which the double-click is received within the subcell 507-1C. Upon receiving the input to indicate interest in the item in subcell 507-1C, a confirmation 530-1C of the received input may be visually displayed on the virtual reality user interface. For example, as shown in FIG. 5, the confirmation 530-1C may comprise a heart symbol that is temporarily overlaid over at least a portion of the subcell 507-1C. The confirmation 530-1C may comprise any other symbols, images, messages, colors, highlights, or other visual indicators. In addition, a counter associated with the interest indicator 508-1C may also be correspondingly incremented in response to the received input.

Alternatively or in addition, responsive to receiving the input to indicate interest in the item in subcell 507-1C, other changes or modifications to the user interface may be effected. For example, one or more supplemental cells may be added, enlarged, or visually emphasized based on an association with the item in subcell 507-1C, and one or more other supplemental cells may be removed, shrunken, or visually deemphasized based on a lack of an association with the item in subcell 507-1C. Further, the subcell 507-1C may move out of its original position, transform into a supplemental cell that represents a collection of items related to the item in subcell 507-1C (for which the user has indicated an interest), and move to a new position as a supplemental cell, e.g., above, below, or otherwise around the periphery of the plurality of cells and subcells.

Figure 6:
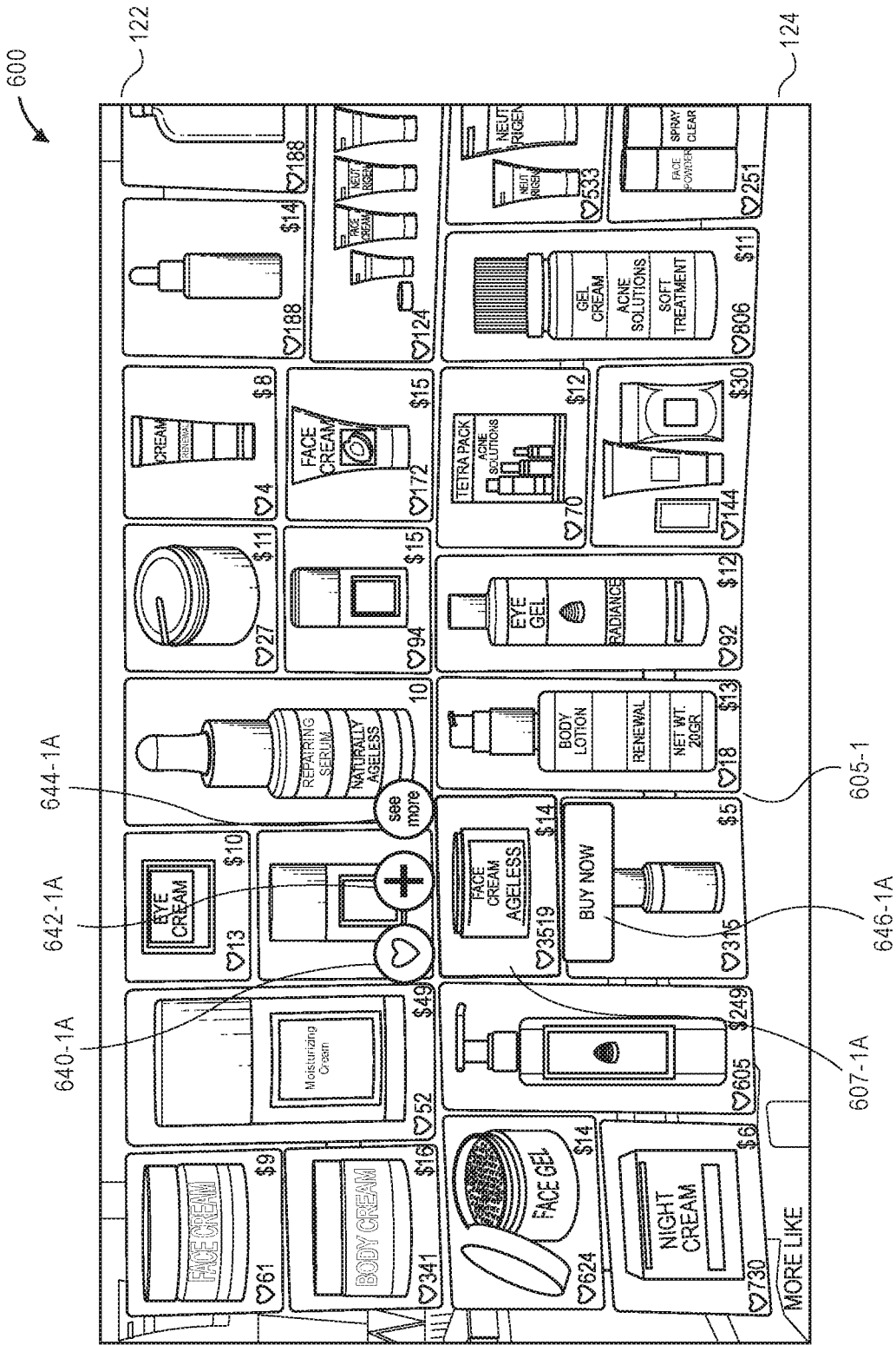
FIG. 6 is a schematic diagram of a sixth example view of a virtual reality user interface, according to an implementation.

FIG. 6 is a schematic diagram of a sixth example view 600 of a virtual reality user interface, according to an implementation.

FIG. 6 shows a portion of the virtual reality user interface that extends to the right of the home position 120 described with respect to FIG. 1A and with an increased level of zoom, e.g., visually appearing closer to a position of the user. The virtual reality user interface may include a plurality of cells 605 and plurality of subcells 607 overlaid over at least a portion of the three-dimensional model 102. For example, as shown in FIG. 6, one cell 605-1 is divided into three subcells including subcell 607-1A having one or more additional details, e.g., interest indicator, price, or other details. Other cells 605 may be divided into other numbers of subcells 607, and other additional details may also be included.

As shown in FIG. 6, a user has selected the subcell 607-1A, or the item represented in the subcell 607-1A. For example, a selection of a subcell or an item in a subcell in the virtual reality user interface may be received by various inputs, e.g., via one or more inputs received via the virtual reality device, a controller, or a voice input. One example input may be a single-click of an input element of a controller in communication with the virtual reality device, in which the single-click is received within the subcell 607-1A. Upon receiving the input to select the item in subcell 607-1A, one or more additional details or options may be visually displayed on the virtual reality user interface. For example, as shown in FIG. 6, an option to indicate interest in the item 640-1A, an option to add the item to an electronic cart 642-1A, an option to see more items related to the selected item 644-1A, and/or an option to purchase the item 646-1A may be displayed. Other details or options may also be displayed, including item details, item availability, shipping information, merchant information, customer ratings or reviews, additional user input options, or any other details. Interaction with any of the additional details or options may also be received by various inputs, e.g., via one or more inputs received via the virtual reality device, a controller, or a voice input. For example, an option to see more details of an item may be selected by a single-click input, a click-hold-pull input, a voice input, or any other inputs as described herein. Although the options 640, 642, 644, 646 shown in FIG. 6 are illustrated in a particular manner, any other shape, form, or arrangement of the additional details or options may be included in the virtual reality user interface.

Figure 7:
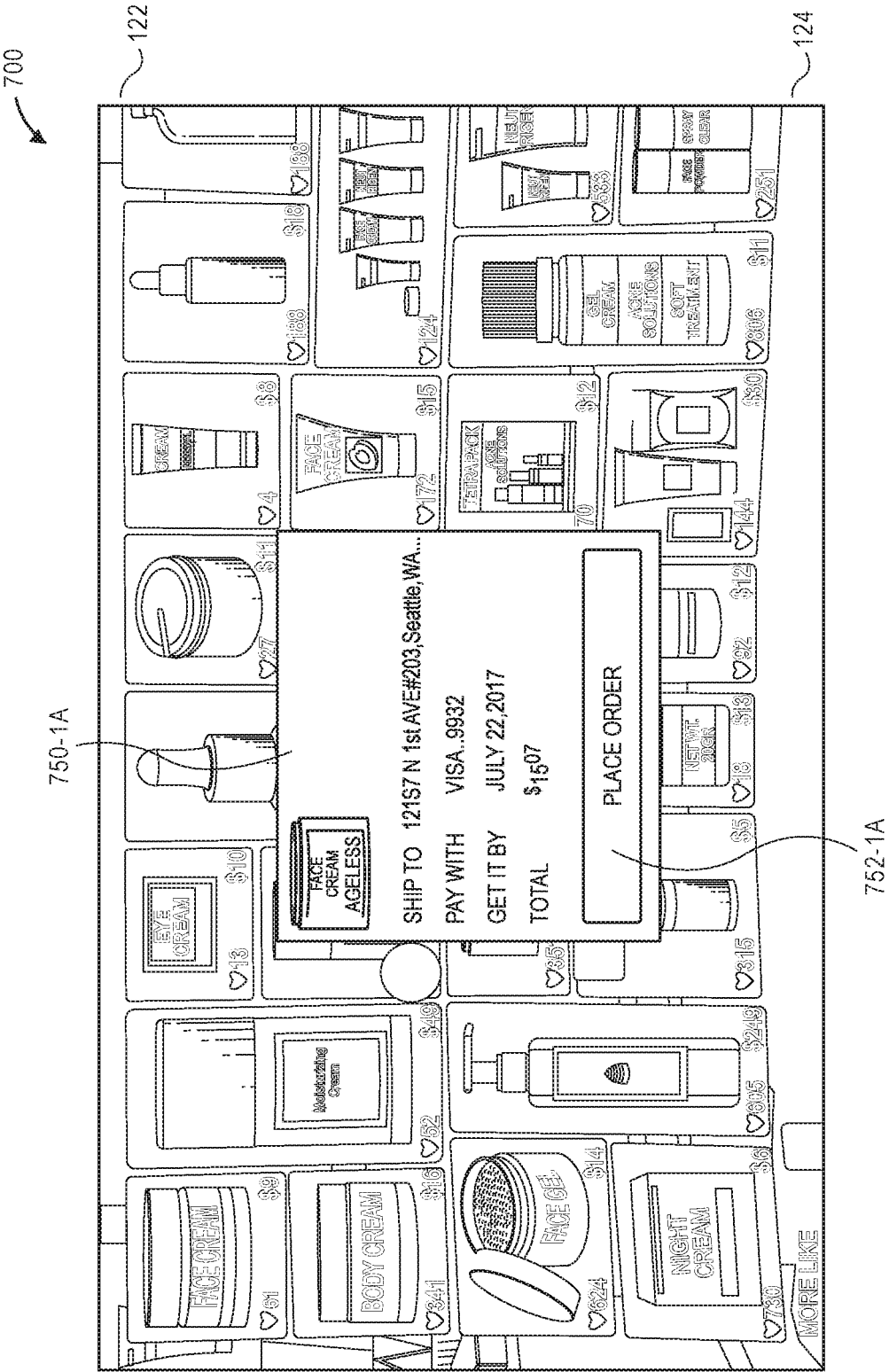
FIG. 7 is a schematic diagram of a seventh example view of a virtual reality user interface, according to an implementation.

FIG. 7 is a schematic diagram of a seventh example view 700 of a virtual reality user interface, according to an implementation.

Continuing from the sixth example view 600 shown in FIG. 6, a user has selected the option the purchase the item 646-1A. For example, a selection of the option 646-1A in the virtual reality user interface may be received by various inputs, e.g., via one or more inputs received via the virtual reality device, a controller, or a voice input. One example input may be a single-click of an input element of a controller in communication with the virtual reality device, in which the single-click is received within the option 646-1A.

Upon receiving the selection of option 646-1A, a pop-up window 750-1A may be displayed to allow the user to complete a purchase of the item represented in subcell 607-1A. For example, the pop-up window 750-1A may include or allow the entry or selection of additional details, including shipping address, payment information, shipping information, price, or other details. In addition, the pop-up window 750-1A may include a selectable option 752-1A to complete the purchase of the item represented in subcell 607-1A. Although FIG. 7 shows the display of a pop-up window 750-1A upon selection of the option 646-1A, the purchase details may be shown by various other methods, including by replacing the contents of the subcell 607-1A with the purchase details, replacing substantially all the plurality of cells 605 and subcells 607 with a window 750-1A that displays the purchase details, or any other methods. In addition, any of the various display methods may also have a simulated depth and simulated curvature as described herein.

Figure 8:
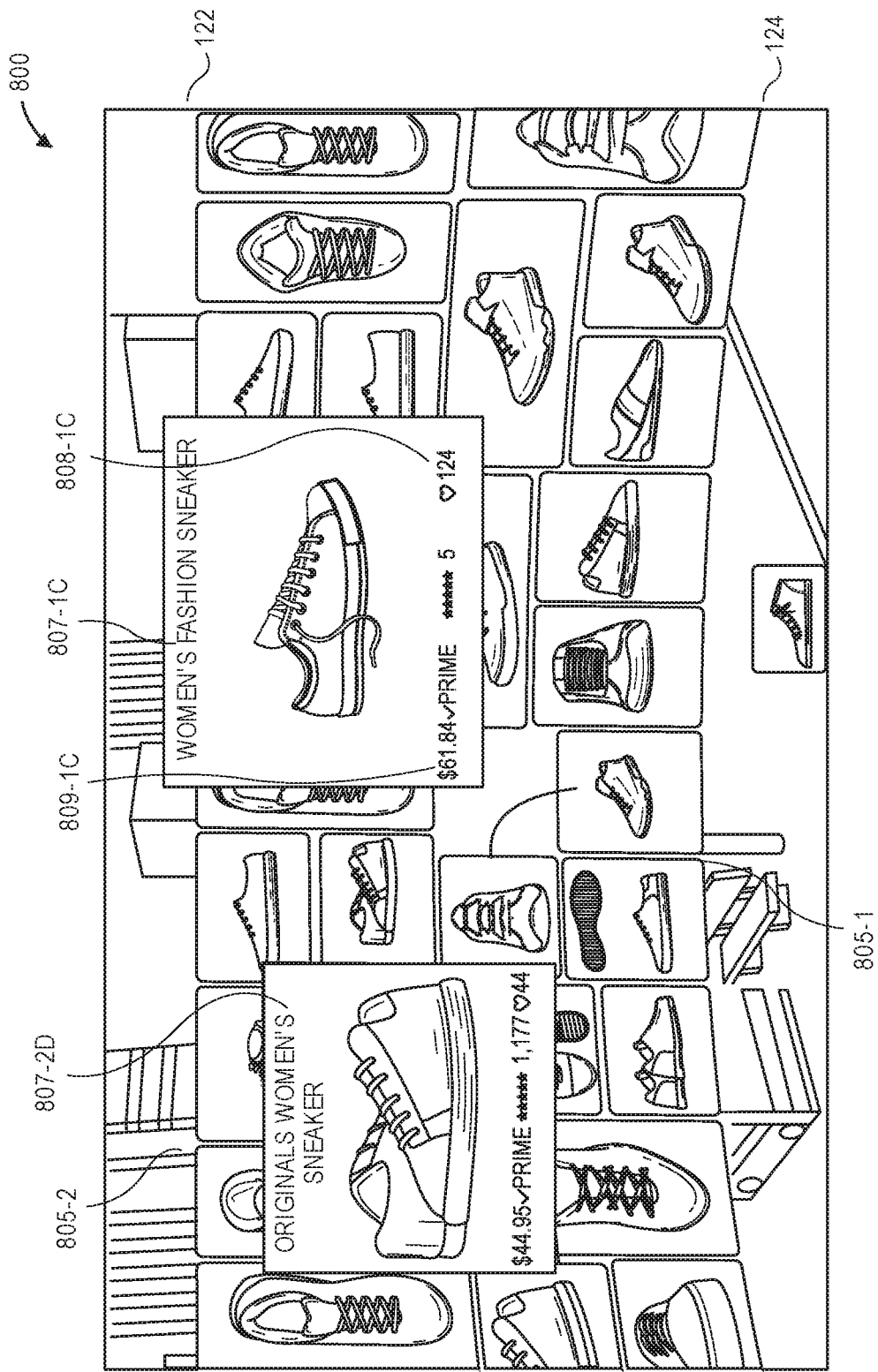
FIG. 8 is a schematic diagram of an eighth example view of a virtual reality user interface, according to an implementation.

FIG. 8 is a schematic diagram of an eighth example view 800 of a virtual reality user interface, according to an implementation.

FIG. 8 shows a portion of the virtual reality user interface that extends to the right of the home position 120 described with respect to FIG. 1A. The virtual reality user interface may include a plurality of cells 805 and plurality of subcells 807 overlaid over at least a portion of the three-dimensional model 102. For example, as shown in FIG. 8, a first cell 805-1 is divided into four subcells including subcell 807-1C, and a second cell 805-2 is also divided into four subcells including subcell 807-2D. Other cells 805 may be divided into other numbers of subcells 807.

As shown in FIG. 8, a user has selected the subcell 807-1C and the subcell 807-2D. For example, a selection of a subcell in the virtual reality user interface may be received by various inputs, e.g., via one or more inputs received via the virtual reality device, a controller, or a voice input. One example input may be a click-hold-move-release of an input element of a controller in communication with the virtual reality device, in which the click-hold-move-release is received within the subcell 807-1C or subcell 807-2D. Upon receiving the click-hold input within a subcell, the subcell may be removed from its original position relative to other subcells of the respective cell, and upon receiving the move-release input of the subcell, the subcell may be placed at a new position. For example, as shown in FIG. 8, subcell 807-1C has been removed from its original position within cell 805-1 and placed at a new position, and subcell 807-2D has also been removed from its original position within cell 805-2 (which is obscured by the new position of subcell 807-2D) and placed at a new position.

In addition, upon removal and placement of a subcell at a new position, the subcell may appear to grow larger or move closer to a position of the user, e.g., by increasing a level of zoom of the subcell. The increased level of zoom of a removed subcell may comprise a preview of an item represented in the subcell. For example, subcell 807-1C appears larger and with an increased level of zoom as compared to its size at an original position within cell 805-1, and subcell 807-2D also appears larger and with an increased level of zoom as compared to its size at an original position within cell 805-2. Further, with the increased level of zoom, additional details or information may be included in each of the subcells 807. For example, the additional information may include interest or popularity indicators 808, price 809, or any other information. As shown in FIG. 8, subcell 807-1C includes interest indicator 808-1C, price 809-1C, customer rating information, and shipping information. Other additional details or information may include item details, item availability, shipping information, merchant information, customer ratings or reviews, user input options, or any other details. Multiple subcells 807 may be selected for viewing, e.g., in respective previews, by a user at the same time.

Within the preview of each removed and placed subcell, further user interactions may be possible. For example, a left or right swipe input received via a controller within the subcell at the new position may cause additional images or information related to the item to be viewed, e.g., similar to turning pages of a book or scrolling through available images.

As described with respect to FIG. 8, one or more sections, e.g., previews of expanded subcells, of the virtual reality user interfaces described herein may overlay one or more other sections, e.g., a plurality of cells and subcells. Within the limited field of view of a user, this overlaying of sections may simplify the user interfaces, while still displaying information clearly to a user and also facilitating interactions therewith by a user.

Figure 9:
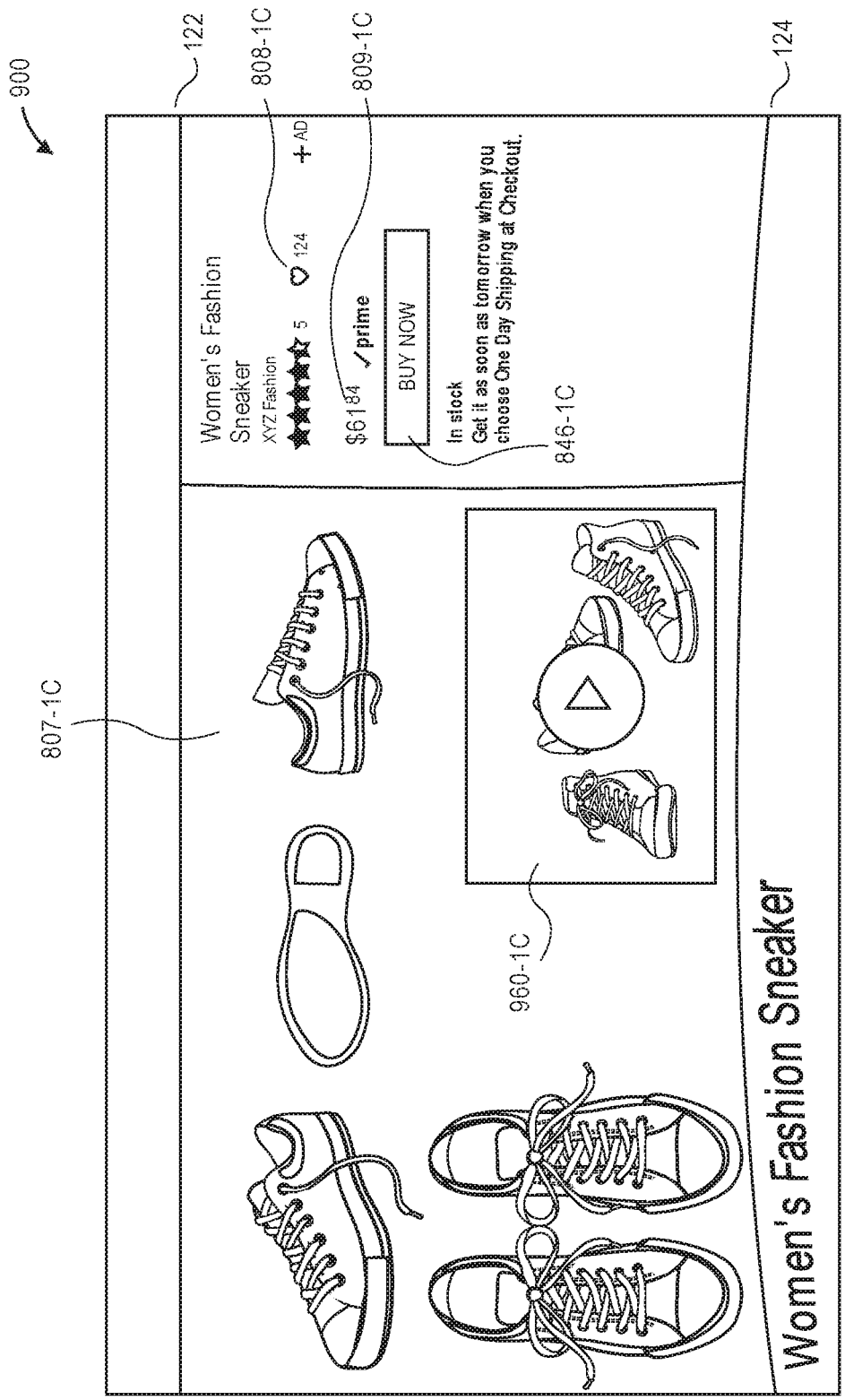
FIG. 9 is a schematic diagram of a ninth example view of a virtual reality user interface, according to an implementation.

FIG. 9 is a schematic diagram of a ninth example view 900 of a virtual reality user interface, according to an implementation.

Continuing from the eighth example view 800 shown in FIG. 8, a user has selected the preview of subcell 807-1C. For example, a selection of the subcell 807-1C in the virtual reality user interface may be received by various inputs, e.g., via one or more inputs received via the virtual reality device, a controller, or a voice input. One example input may be a click-hold-pull of an input element of a controller in communication with the virtual reality device, in which the click-hold-pull is received within the subcell 807-1C.

Upon receiving the selection of the subcell 807-1C, the subcell 807-1C may expand in size and replace all the plurality of cells 805 and plurality of subcells 807. For example, the subcell 807-1C may include additional details, images, or options for the item represented in the subcell 807-1C, and the subcell 807-1C may have a simulated depth and simulated curvature as described herein. The subcell 807-1C may include additional images or rotatable 360-degree views of the item, as well as one or more videos 960-1C related to the item. For example, the video may be a video related to the item from a merchant, manufacturer, distributor, retailer, customer, or others.

The expanded subcell 807-1C may also include or allow the entry or selection of additional details, including shipping address, payment information, shipping information, price 809-1C, or other details. Other additional details or information may include interest indicator 808-1C, item details, item availability, merchant information, customer ratings or reviews, user input options, or any other details. In addition, the subcell 807-1C may include a selectable option 846-1C to complete the purchase of the item represented in subcell 807-1C. Although FIG. 9 shows the display of a subcell 807-1C that replaces all the plurality of cells 805 and subcells 807 upon selection, e.g., a click-hold-pull input of the subcell 807-1C, the additional details, images, or options for the item may be shown by various other methods, including by displaying a pop-up window with the additional details, replacing the contents of the subcell 807-1C with the additional details, or any other methods. In addition, any of the various display methods may also have a simulated depth and simulated curvature as described herein.

Figure 10:
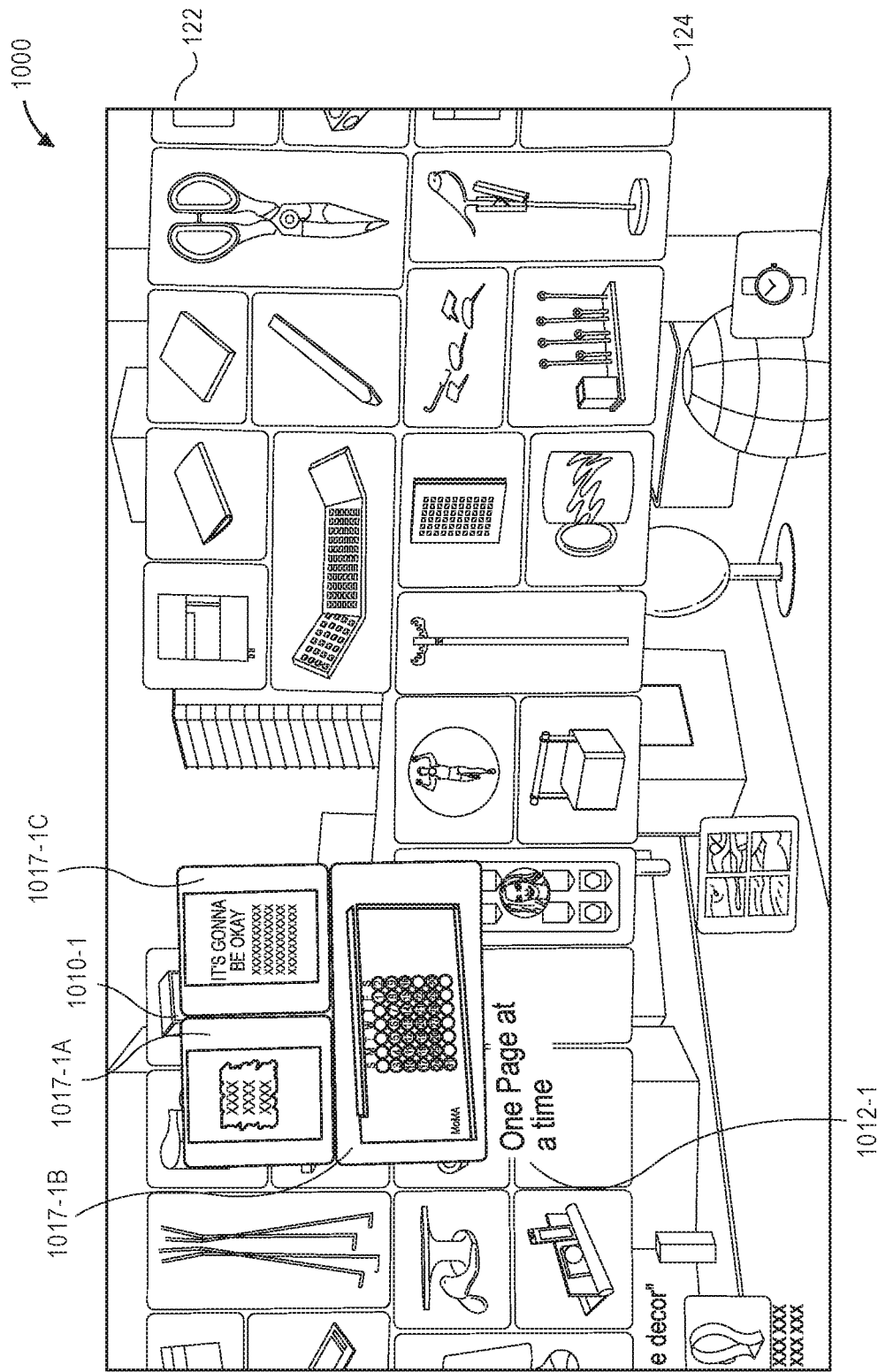
FIG. 10 is a schematic diagram of a tenth example view of a virtual reality user interface, according to an implementation.

FIG. 10 is a schematic diagram of a tenth example view 1000 of a virtual reality user interface, according to an implementation.

FIG. 10 shows a portion of the virtual reality user interface that extends to the right of the home position 120 described with respect to FIG. 1A. The virtual reality user interface may include a plurality of cells and plurality of subcells overlaid over at least a portion of the three-dimensional model 102, and at least one supplemental cell within the plurality of cells, e.g., that replaces one of the cells, as described herein with respect to FIG. 3. For example, as shown in FIG. 10, a first supplemental cell 1010-1 is shown being removed from its original position within the plurality of cells and subcells.

As shown in FIG. 10, a user has selected the first supplemental cell 1010-1. For example, a selection of a supplemental cell in the virtual reality user interface may be received by various inputs, e.g., via one or more inputs received via the virtual reality device, a controller, or a voice input. One example input may be a click-hold-move-release of an input element of a controller in communication with the virtual reality device, in which the click-hold-move-release is received within the first supplemental cell 1010-1. Upon receiving the click-hold input within a supplemental cell, the supplemental cell may be removed from its original position relative to other cells and subcells, and upon receiving the move-release input of the supplemental cell, the supplemental cell may be placed at a new position. For example, as shown in FIG. 10, first supplemental cell 1010-1 having corresponding label 1012-1 has been removed from its original position within other cells and subcells (which is partially obscured by the new position of the first supplemental cell 1010-1) and placed at a new position.

In addition, upon removal and placement of a supplemental cell at a new position, the supplemental cell may appear to grow larger or move closer to a position of the user, e.g., by increasing a level of zoom of the subcell. In addition, the supplemental cell may expand to include a plurality of cells, and each cell may also divide into a plurality subcells, with each subcell being sized to include a respective image. The increased level of zoom, expansion to a plurality of cells, and division into subcells of a removed supplemental cell may comprise a preview of a collection of items represented by the supplemental cell. For example, as shown in FIG. 10, first supplemental cell 1010-1 appears larger with an increased level of zoom and with a plurality of subcells 1017-1A, 1017-1B, 1017-1C as compared to its size and content at an original position within cells and subcells. Further, with the increased level of zoom, additional details or information may be included in each of the subcells 1017. For example, the additional information may include interest or popularity indicators, price, or any other information. Other additional details or information may include item details, item availability, shipping information, merchant information, customer ratings or reviews, user input options, or any other details.

Within the preview of each removed and placed supplemental cell, further user interactions may be possible. For example, a left or right swipe input received via a controller within the supplemental cell at the new position may cause additional cells (and corresponding subcells) included in the collection of items to be viewed, e.g., similar to turning pages of a book or scrolling through available images.

Figure 11:
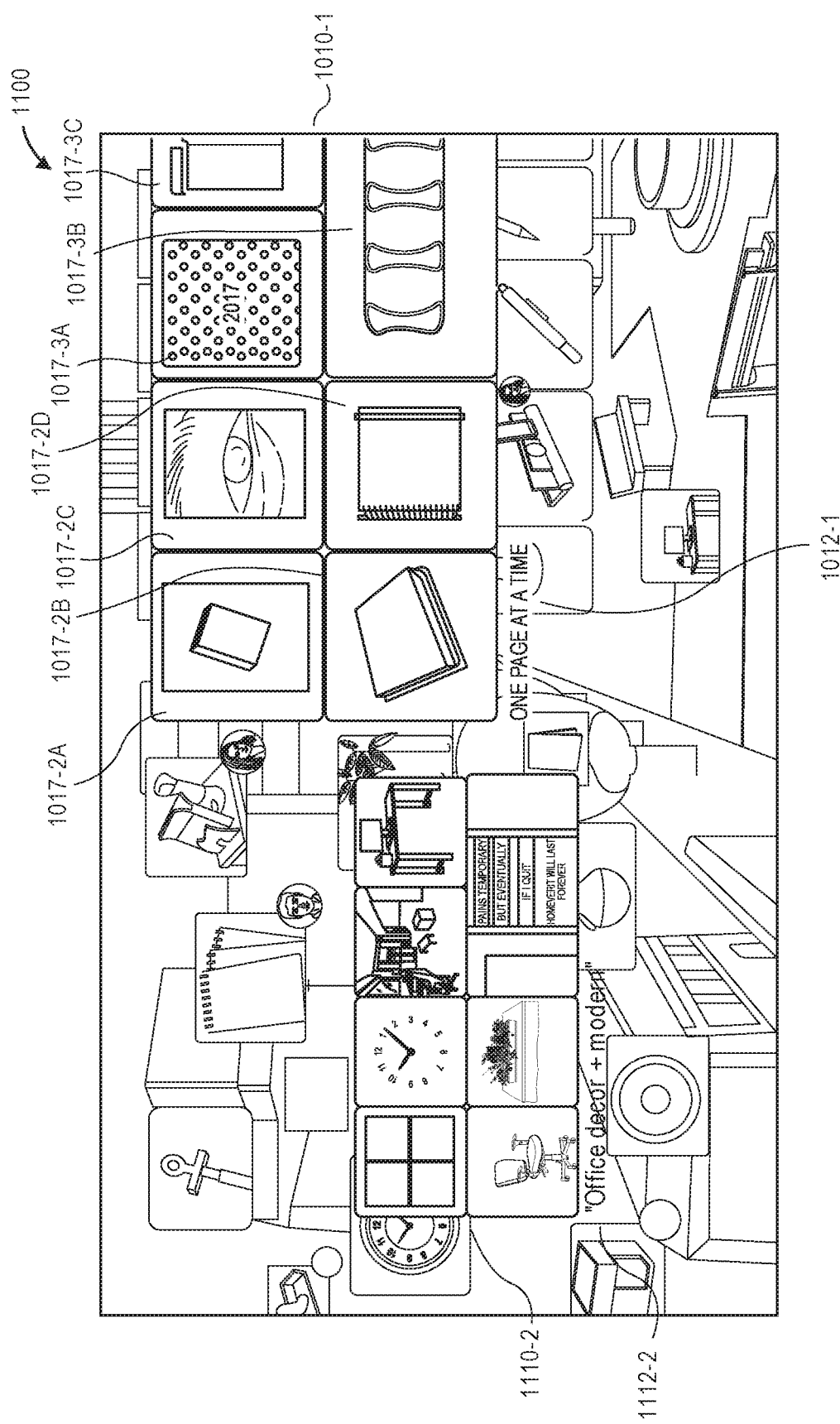
FIG. 11 is a schematic diagram of an eleventh example view of a virtual reality user interface, according to an implementation.

FIG. 11 is a schematic diagram of an eleventh example view 1100 of a virtual reality user interface, according to an implementation.

Continuing from the tenth example view 1000 shown in FIG. 10, a user has scrolled within the preview of the first supplemental cell 1010-1. For example, scrolling within the preview of the first supplemental cell 1010-1 in the virtual reality user interface may be received by various inputs, e.g., via one or more inputs received via the virtual reality device, a controller, or a voice input. One example input may be a right-to-left swipe input received via an input element of a controller in communication with the virtual reality device, in which the right-to-left swipe input is received within the first supplemental cell 1010-1, that may cause scrolling of the subcells 1017. As shown in FIG. 10, as a result of the scrolling, subcells 1017-1A, 1017-1B, 1017-1C may move out of view within the preview, and subcells 1017-2A, 1017-2B, 1017-2C, 1017-2D, 1017-3A, 1017-3B, 1017-3C may move into view within the preview.

As also shown in FIG. 11, multiple supplemental cells 1010, 1110 may be selected for viewing, e.g., in respective previews, by a user at the same time. For example, second supplemental cell 1110-2 having corresponding label 1112-2 may have also been selected by a user. For example, a selection of a supplemental cell in the virtual reality user interface may be received by various inputs, e.g., via one or more inputs received via the virtual reality device, a controller, or a voice input. One example input may be a click-hold-move-release of an input element of a controller in communication with the virtual reality device, in which the click-hold-move-release is received within the second supplemental cell 1110-2. Upon receiving the click-hold input within a supplemental cell, the supplemental cell may be removed from its original position relative to other cells and subcells, and upon receiving the move-release input of the supplemental cell, the supplemental cell may be placed at a new position. For example, as shown in FIG. 11, second supplemental cell 1110-2 having corresponding label 1112-2 has been removed from its original position relative to other cells and subcells (which is partially obscured by the new position of the second supplemental cell 1110-2) and placed at a new position.

In addition, upon removal and placement of a supplemental cell at a new position, the supplemental cell may appear to grow larger or move closer to a position of the user, e.g., by increasing a level of zoom of the subcell. In addition, the supplemental cell may expand to include a plurality of cells, and each cell may also divide into a plurality subcells, with each subcell being sized to include a respective image. The increased level of zoom, expansion to a plurality of cells, and division into subcells of a removed supplemental cell may comprise a preview of a collection of items represented by the supplemental cell. For example, as shown in FIG. 11, second supplemental cell 1110-2 appears larger with an increased level of zoom, with an expanded number of cells, and with a plurality of subcells as compared to its size and content at an original position within cells and subcells. Further, with the increased level of zoom, additional details or information may be included in each of the subcells. For example, the additional information may include interest or popularity indicators, price, or any other information. Other additional details or information may include item details, item availability, shipping information, merchant information, customer ratings or reviews, user input options, or any other details.

As described with respect to FIG. 11, one or more sections, e.g., previews of expanded supplemental cells, of the virtual reality user interfaces described herein may overlay one or more other sections, e.g., a plurality of cells and subcells and/or supplemental cells. Within the limited field of view of a user, this overlaying of sections may simplify the user interfaces, while still displaying information clearly to a user and also facilitating interactions therewith by a user.

Figure 12:
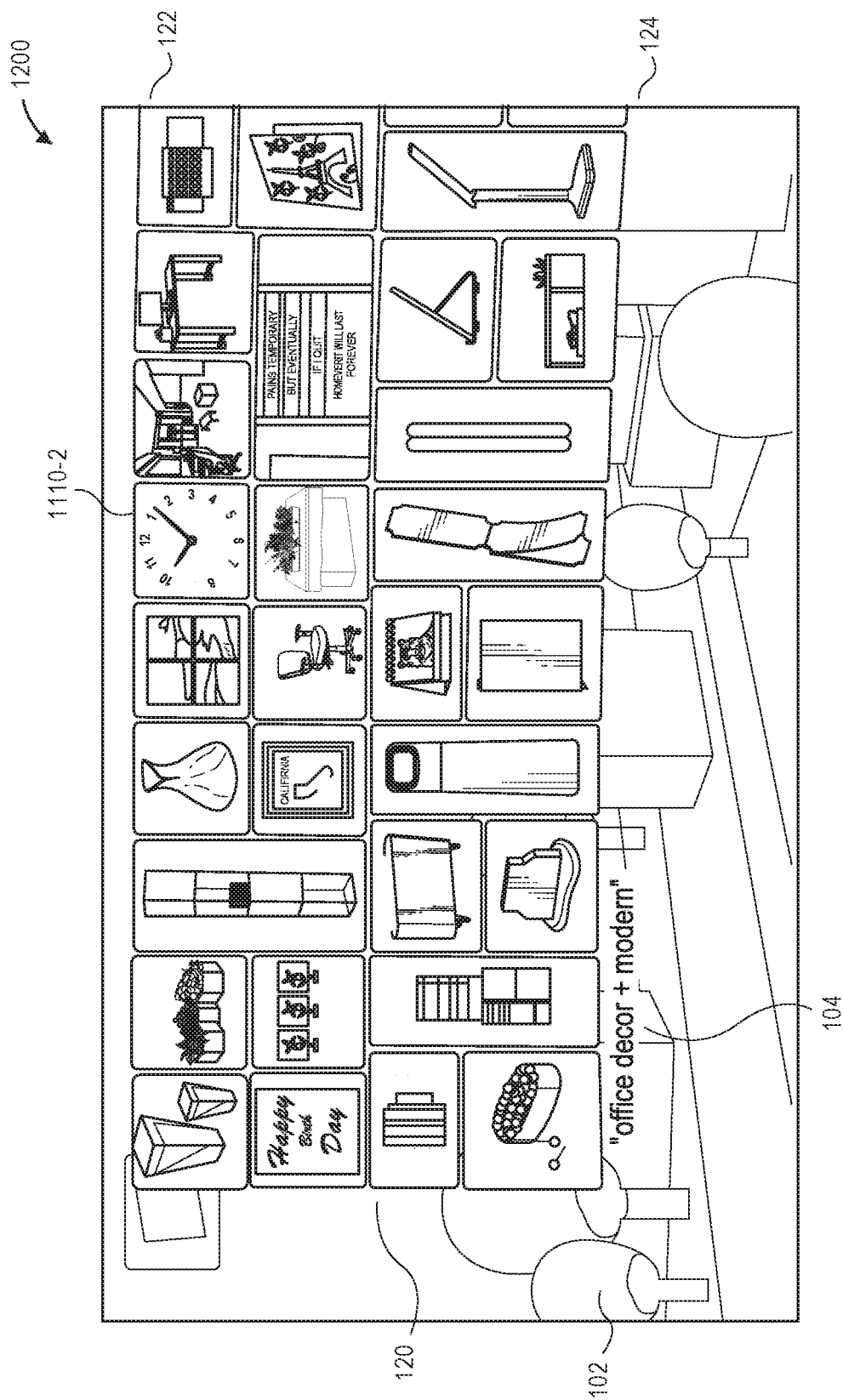
FIG. 12 is a schematic diagram of a twelfth example view of a virtual reality user interface, according to an implementation.

FIG. 12 is a schematic diagram of a twelfth example view 1200 of a virtual reality user interface, according to an implementation.

Continuing from the tenth and eleventh example views 1000, 1100 shown in FIGS. 10 and 11, a user has further selected the preview of the second supplemental cell 1110-2. For example, a selection of the second supplemental cell 1110-2 in the virtual reality user interface may be received by various inputs, e.g., via one or more inputs received via the virtual reality device, a controller, or a voice input. One example input may be a click-hold-pull of an input element of a controller in communication with the virtual reality device, in which the click-hold-pull is received within the second supplemental cell 1110-2.

Upon receiving the selection of the second supplemental cell 1110-2, the second supplemental cell 1110-2 may expand in size, reveal additional cells, divide into respective subcells, and replace all the plurality of cells and subcells previously displayed. For example, the second supplemental cell 1110-2 may include its own plurality of cells and plurality of subcells that replace any previously displayed cells and subcells. In addition, the plurality of cells and subcells of the expanded second supplemental cell 1110-2 may overlay at least a portion of the three-dimensional model 102, may include a label 104, may begin at a home position 120, and may have a simulated depth and simulated curvature, e.g., based at least in part on upper edges 122, lower edges 124, and/or shapes of the subcells, as described herein. Further, interactions with the cells, subcells, and/or supplemental cells displayed as part of the expanded second supplemental cell 1110-2 may occur in similar manner as described herein.

Although FIG. 12 shows the display of a second supplemental cell 1110-2 that replaces all the plurality of cells and subcells previously displayed upon selection, e.g., a click-hold-pull input of the second supplemental cell 1110-2, the additional cells, subcells, and/or supplemental cells of the expanded second supplemental cell 1110-2 may be shown by various other methods, including by displaying a pop-up window with the additional details, or any other methods. In addition, any of the various display methods may also have a simulated depth and simulated curvature as described herein.

Figure 13:
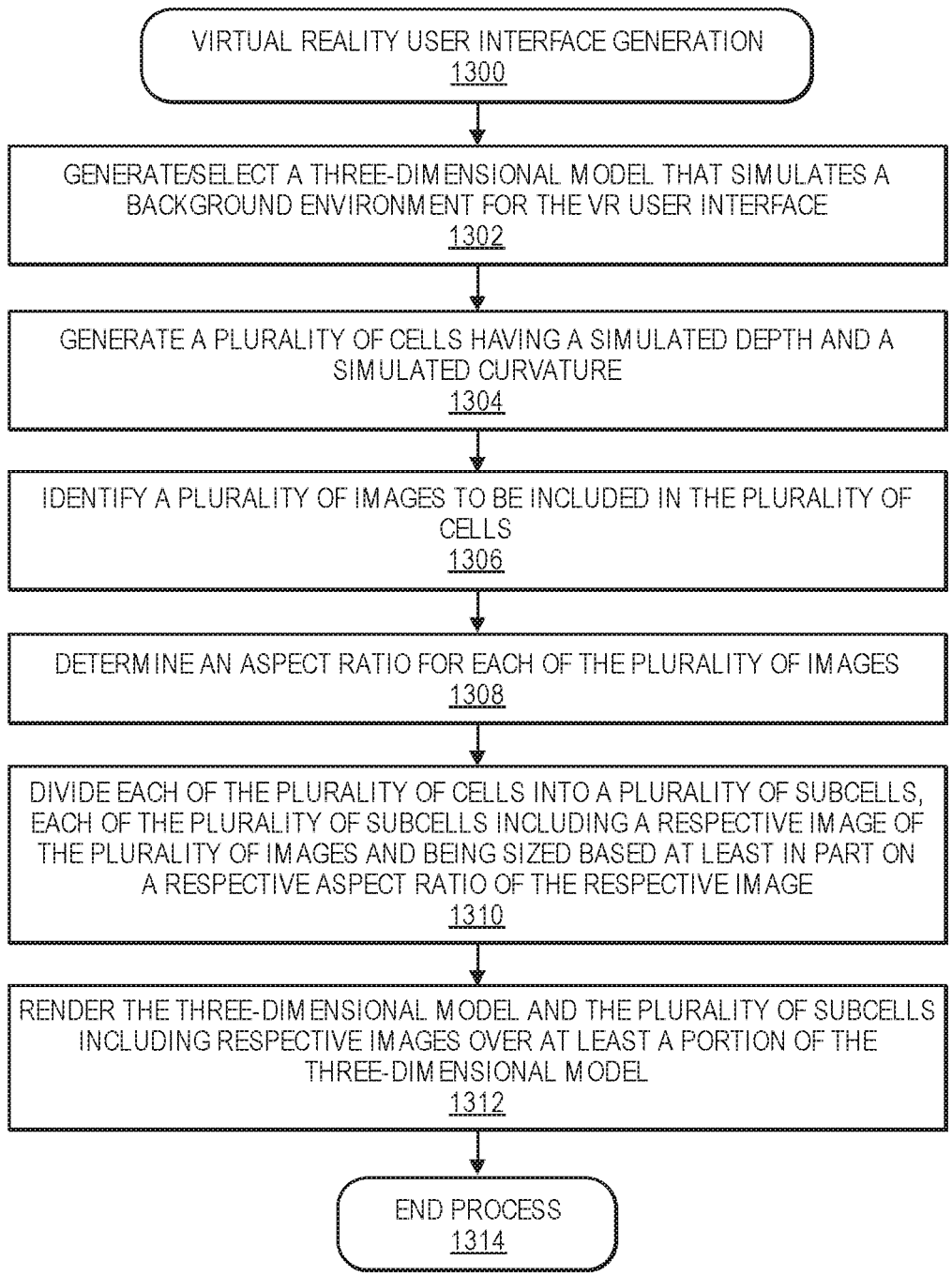
FIG. 13 is a flow diagram illustrating an example virtual reality user interface generation process, according to an implementation.

FIG. 13 is a flow diagram illustrating an example virtual reality user interface generation process 1300, according to an implementation.

The process 1300 may begin by generating or selecting a three-dimensional model that simulates a background scene or environment for the virtual reality user interface, as at 1302. For example, the three-dimensional model may simulate a default image, scene, or environment. In some embodiments, a user may select a particular three-dimensional model that simulates a background scene or environment, or a theme associated with various three-dimensional models, e.g., cityscapes, national parks, museums, restaurants, cafes, or others. In addition, in other embodiments, a three-dimensional model may be selected based at least in part on user preferences, user input, user selection, search queries, currently viewed items, viewing history, purchasing history, or any other factors. For example, if a user is currently searching for winter coats, a three-dimensional model may be selected that is potentially related to winter coats, e.g., snowcapped mountains, a ski resort, an urban area or public park in the fall/winter, or others. Further, the three-dimensional model may be sized to approximately correspond to a real-world environment, in order to provide visual cues and context to orient a user of a virtual reality device.

The process 1300 may continue by generating a plurality of cells having a simulated depth and a simulated curvature, as at 1304. For example, the plurality of cells may be arranged in a grid pattern overlaying at least a portion of the three-dimensional model. The plurality of cells may appear to be positioned between a position of a user and the three-dimensional model that simulates a background environment, e.g., at a simulated depth between approximately eight feet and approximately twelve feet in front of the user. In addition, the plurality of cells may appear to wrap or extend around a position of the user, e.g., at a simulated curvature with a position of the user as an approximate center point.

The process 1300 may then proceed by identifying a plurality of images to be included in the plurality of cells, as at 1306. The plurality of images may be obtained or received from a catalog service, an electronic commerce service, or other similar service. For example, an online retailer may maintain a catalog of items, including images, data, and other details associated with each of the items. Based at least in part on an input from a user, e.g., a search query, a user selection, user history, or other inputs, a plurality of images related to the input may be requested and received from the catalog service. If multiple images are received for a single item, one of the images may be designated as a primary image, or various image processing and analysis may be performed upon the multiple images to identify a most representative image of the item.

For each of the plurality of images, e.g., each of the primary images, the process 1300 may then continue by determining an aspect ratio for each of the plurality of images, as at 1308. For example, aspect ratios for each of the images may be determined, and then, the images may be grouped based on the determined aspect ratios such that each group of images approximately fits within a cell without creating excess empty space or gaps between subcells and cells.

Then, the process 1300 may proceed by dividing each of the plurality of cells into a plurality of subcells, as at 1310.

Each of the plurality of subcells may include a respective image of the plurality of images, and may also be sized based at least in part on the respective aspect ratio of the respective image. For example, based on the determined aspect ratios and/or groups of images, each cell may be divided into a plurality of subcells to accommodate a group of images. In addition, the plurality of cells may be divided into respective pluralities of subcells such that adjacent cells and subcells do not have identical dimensions. In this manner, the variation in sizes of the subcells may increase and/or maintain user interest in the virtual reality user interface, as compared to user interface designs having user interface elements with substantially uniform sizes or dimensions.

The process 1300 may then proceed to render the three-dimensional model and the plurality of subcells over at least a portion of the three-dimensional model, as at 1312. Each of the plurality of subcells may include a respective image and be sized based at least in part on a respective aspect ratio of the respective image. The plurality of subcells may define a home position that is approximately in front of an initial field of view of a user, e.g., defined as approximately 0 degrees, and the plurality of subcells may extend or wrap around a position of the user by approximately 170 degrees. In addition, supplemental cells may also be rendered, either as replacements of one or more cells or subcells or around a periphery of the plurality of cells and subcells, and each of the supplemental cells may represent an item or a collection of items. Further, supplemental cells may also be rendered to the left of the home position, e.g., up to approximately 30 degrees to the left of the home position from the initial field of view of the user. The different presentation of the supplemental cells within or around the plurality of cells and subcells may also increase and/or maintain user interest in the virtual reality user interface. The process 1300 may then end, as at 1314.

Figure 14A:
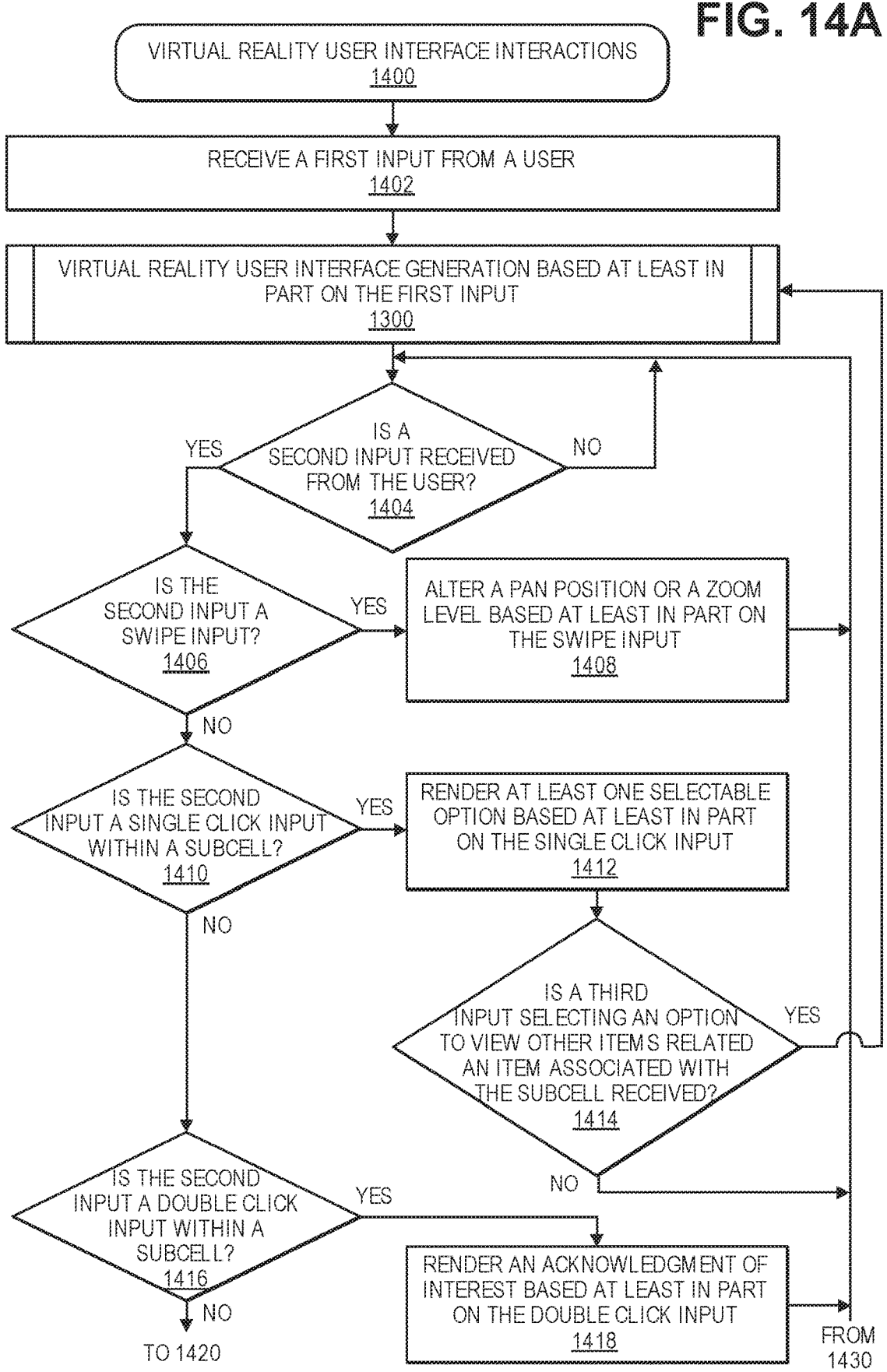
FIGS. 14A-14C are flow diagrams illustrating an example virtual reality user interface interactions process, according to an implementation.
Figure 14B:
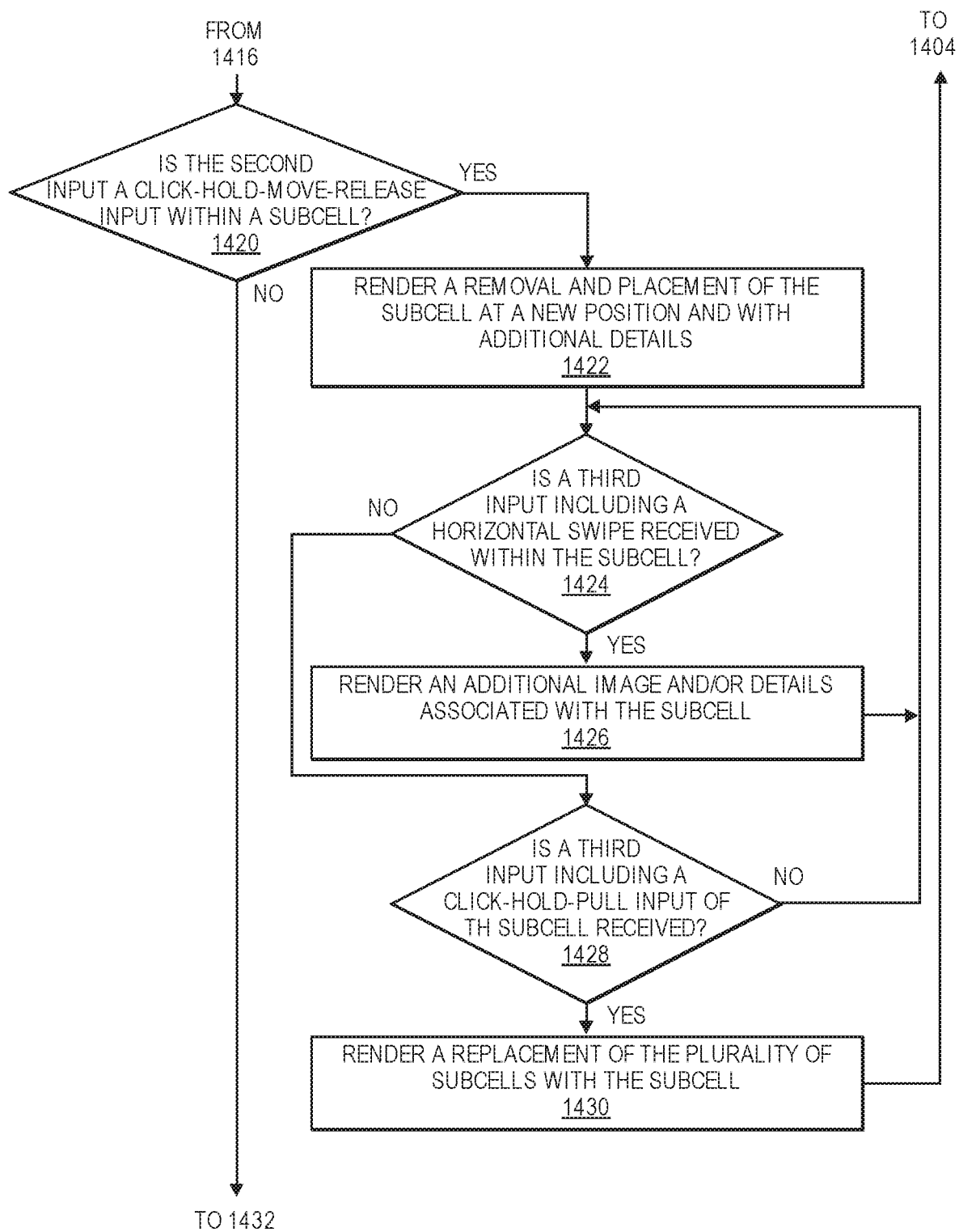
Figure 14C:
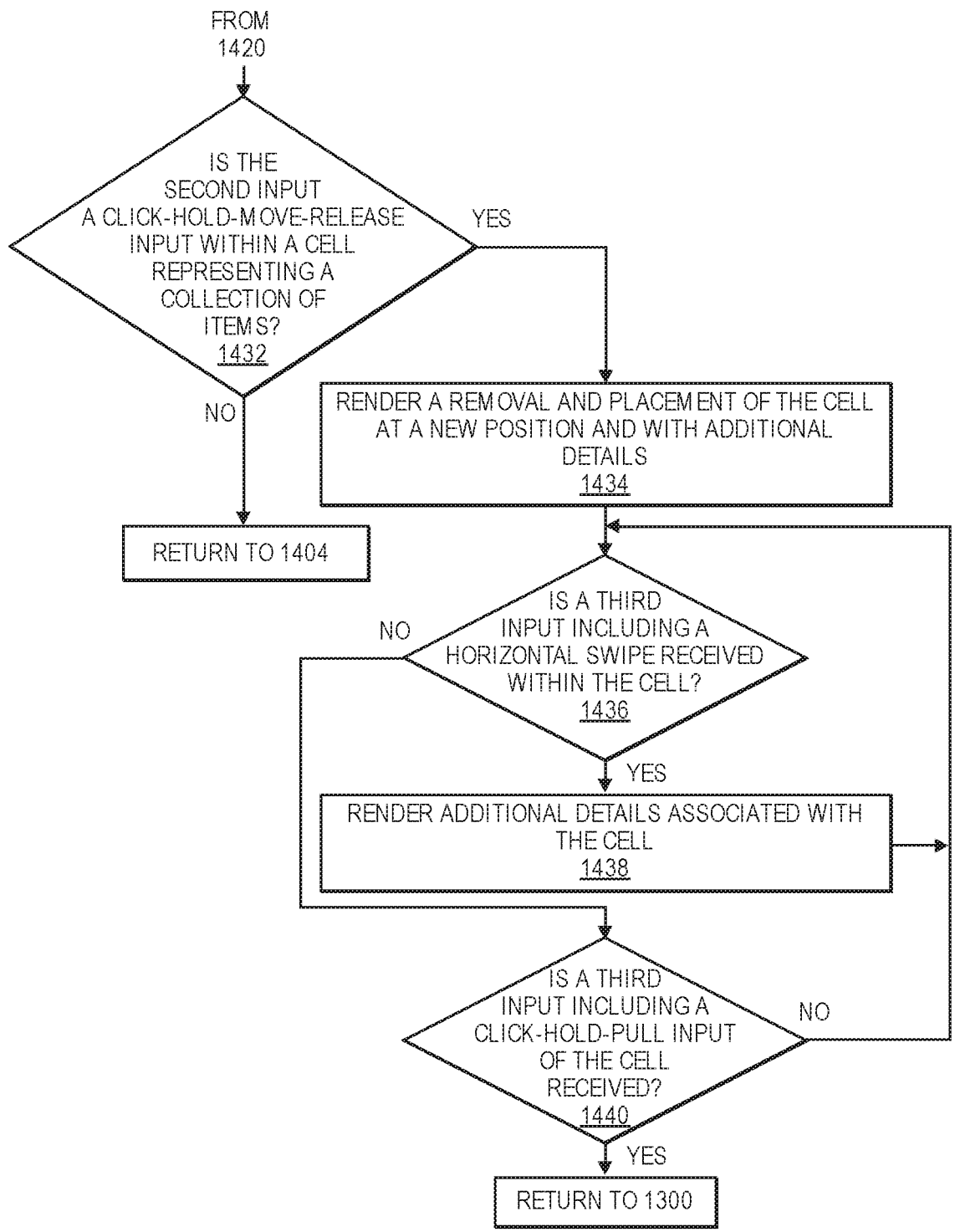

FIGS. 14A-14C are flow diagrams illustrating an example virtual reality user interface interactions process 1400, according to an implementation.

The process 1400 may begin by receiving a first input from a user, as at 1402. For example, the first input may comprise a startup of the virtual reality user interface, a search query, a selection of a supplemental cell representing a collection of items, a selection of an option to see more items related to an item, a selection of an option to view a list or group of items, e.g., previously viewed or ordered items, or other similar input. The first input may be received by various input methods, e.g., via one or more inputs received via the virtual reality device, a controller, or a voice input. Based at least in part on the first input, the process 1400 may continue by generating the virtual reality user interface 1300, as described with respect to FIG. 13.

The process 1400 may then proceed by determining whether a second input is received from the user, as at 1404. If not, the process 1400 may continue to monitor whether a second input is received.

If a second input is received at 1404, then the process 1400 may proceed to determine if the second input is a swipe input, or other similar pan, tilt, or zoom input, as at 1406. If the second input is a swipe input, or other similar pan, tilt, or zoom input, then the process 1400 may continue to alter a pan or tilt position, or a zoom level, based at least in part on the second input, as at 1408. For example, for swipe inputs received via an input element on a controller in communication with the virtual reality device, left or right swipe movements may cause panning or scrolling of the user interface, and down or up swipe movements may cause changes in zoom of the user interface. Further, text or voice inputs related to pan, tilt, or zoom may be processed, analyzed, and/or recognized to effect corresponding changes to the user interface. Then, the process 1400 may return to 1404 to determine whether a further second input is received from the user.

If the second input is not a swipe input, or other similar pan, tilt, or zoom input, as at 1406, then the process 1400 may proceed to determine if the second input is a single-click input or other similar selection input received within a subcell, as at 1410. If the second input is a single-click input or other similar selection input within a subcell, then the process 1400 may continue to render at least one selectable option based at least in part on the single-click input, as at 1412. For example, a single-click input received via an input element on a controller in communication with the virtual reality device may cause display of various selectable options related to an item represented in the subcell. Further, text or voice inputs related to selection of subcells may be processed, analyzed, and/or recognized to effect corresponding changes to the user interface. The selectable options may include an option to indicate interest in the item, an option to add the item to an electronic cart, an option to see more items related to the selected item, and/or an option to purchase the item. Other details or options may also be displayed, including item details, item availability, shipping information, merchant information, customer ratings or reviews, additional user input options, or any other details.

Additional inputs, e.g., single-click inputs, may also be received with respect to one or more of the selectable options, e.g., to indicate interest in an item, add the item to a cart, or purchase the item, and corresponding actions may be taken based on such additional inputs. In addition, the process 1400 may proceed to determine if a third input, e.g., a single-click input, selecting an option to view other items related to an item associated with the subcell is received, as at 1414. If not, the process 1400 may return to 1404 to determine whether a further second input is received from the user. If a third input is received selecting an option to view related items, then the process may continue to generate a virtual reality user interface based at least in part on the first input, as at 1300, in which the third input received from the user is used as the first input. That is, the three-dimensional model, cells, subcells, and/or supplemental cells of the virtual reality user interface may be replaced with a three-dimensional model, cells, subcells, and/or supplemental cells that are determined based at least in part on the third input, i.e., other items related to an item associated with the selected subcell.

If the second input is not a swipe input, or other similar pan, tilt, or zoom input, as at 1406, or a single-click input or other similar selection input, as at 1410, then the process 1400 may proceed to determine if the second input is a double-click input or other similar double selection input received within a subcell, as at 1416. If the second input is a double-click input or other similar double selection input within a subcell, then the process 1400 may continue to render an acknowledgment of interest, or take various other desired actions, based at least in part on the double-click input, as at 1418. For example, a double-click input received via an input element on a controller in communication with the virtual reality device may cause display of symbols, images, messages, colors, highlights, or other visual indicators within the subcell as acknowledgment of the interest. Further, text or voice inputs related to double selection of subcells may be processed, analyzed, and/or recognized to effect corresponding changes to the user interface. Then, the process 1400 may return to 1404 to determine whether a further second input is received from the user.

If the second input is not a swipe input, or other similar pan, tilt, or zoom input, as at 1406, a single-click input or other similar selection input, as at 1410, or a double-click input or other similar double selection input, as at 1416, then the process 1400 may proceed to determine if the second input is a click-hold-move-release input or other similar removal and placement input received within a subcell, as at 1420. If the second input is a click-hold-move-release input or other similar removal and placement input within a subcell, then the process 1400 may continue to render a removal and placement of the subcell at a new position, and potentially with additional details, as at 1422. Further, text or voice inputs related to removal and placement of subcells may be processed, analyzed, and/or recognized to effect corresponding changes to the user interface.

The process 1400 may then proceed to determine if a third input including a horizontal swipe input or other similar scrolling input is received within the subcell, as at 1424. If yes, then the process may continue to render additional images and/or details associated with the subcell responsive to the horizontal swipe input or other similar scrolling input, as at 1426. Then, the process 1400 may continue to monitor whether a further third input is received.

If the third input is not a horizontal swipe input or other similar scrolling input, as at 1424, then the process 1400 may proceed to determine if the third input is a click-hold-pull (or click-hold-swipe) input or other similar removal and expansion input received within the subcell, as at 1428. If not, the process may continue to monitor whether a further third input is received. If yes, then the process may continue to render a replacement of the plurality of cells and subcells with a removal and expansion of the selected subcell, as at 1430. For example, the expanded subcell may include additional details, images, or options related to an item represented by the subcell, and the expanded subcell may have a simulated depth and a simulated curvature as described herein. Further, text or voice inputs related to removal and expansion of a subcell may be processed, analyzed, and/or recognized to effect corresponding changes to the user interface. Then, the process 1400 may return to 1404 to determine whether a further second input is received from the user.

If the second input is not a swipe input, or other similar pan, tilt, or zoom input, as at 1406, a single-click input or other similar selection input, as at 1410, a double-click input or other similar double selection input, as at 1416, or a click-hold-move-release input or other similar removal and placement input received within a subcell, as at 1420, then the process 1400 may proceed to determine if the second input is a click-hold-move-release input or other similar removal and placement input received within a supplemental cell, as at 1432. If the second input is a click-hold-move-release input or other similar removal and placement input within a supplemental cell, then the process 1400 may continue to render a removal and placement of the supplemental cell at a new position, and potentially with additional cells, subcells, images, and/or details, as at 1434. Further, text or voice inputs related to removal and placement of a supplemental cell may be processed, analyzed, and/or recognized to effect corresponding changes to the user interface.

The process 1400 may then proceed to determine if a third input including a horizontal swipe input or other similar scrolling input is received within the supplemental cell, as at 1436. If yes, then the process may continue to render additional cells, subcells, images, and/or details associated with the supplemental cell responsive to the horizontal swipe input or other similar scrolling input, as at 1438. Then, the process 1400 may continue to monitor whether a further third input is received.

If the third input is not a horizontal swipe input or other similar scrolling input, as at 1436, then the process 1400 may proceed to determine if the third input is a click-hold-pull (or click-hold-swipe) input or other similar removal and expansion input received within the supplemental cell, as at 1440. If not, the process may continue to monitor whether a further third input is received. If yes, then the process may continue to render a replacement of the plurality of cells and subcells with a removal and expansion of the selected supplemental cell. For example, the process may continue to generate a virtual reality user interface based at least in part on the first input, as at 1300, in which the third input received from the user is used as the first input. That is, the three-dimensional model, cells, subcells, and/or supplemental cells of the virtual reality user interface may be replaced with a three-dimensional model, cells, subcells, and/or supplemental cells that are determined based at least in part on the third input, i.e., removal and expansion of the selected supplemental cell representing a collection of items. The expanded supplemental cell may include additional cells, subcells, supplemental cells, details, images, or options related to a collection of items represented by the supplemental cell, and the expanded supplemental cell may have a simulated depth and a simulated curvature as described herein. Further, text or voice inputs related to removal and expansion of a supplemental cell may be processed, analyzed, and/or recognized to effect corresponding changes to the user interface.

Although FIGS. 14A-14C show a particular sequence of steps or operations, the illustrated sequence is merely illustrative and is not intended to limit the disclosure herein. For example, various types of inputs may be received in a variety of combinations or sequences, e.g., first, second, third, or other inputs using any of various input methods may be received in any combination or sequence. FIGS. 14A-14C merely provide an example sequence to illustrate some of the possible interactions with the virtual reality user interfaces described herein, and FIGS. 14A-14C are not intended to limit or preclude any other combinations or sequences of inputs by which users may interact with the virtual reality user interfaces described herein. For example, pan, tilt, and zoom inputs may be received at any time while interacting with the virtual reality user interfaces, and additional images/details/options or previews of items or collections of items may be viewed, moved, closed, or otherwise manipulated in various combinations and sequences. Moreover, any of the various inputs may be dismissed or reversed via "back," "undo," "close," or "dismiss" type inputs received via any input methods. Further, other possible inputs may include a "home" type input that returns a user to a home position, or a startup or home screen at any time, or a "search" type input that allows a user to input a search query at any time.

Figure 15:
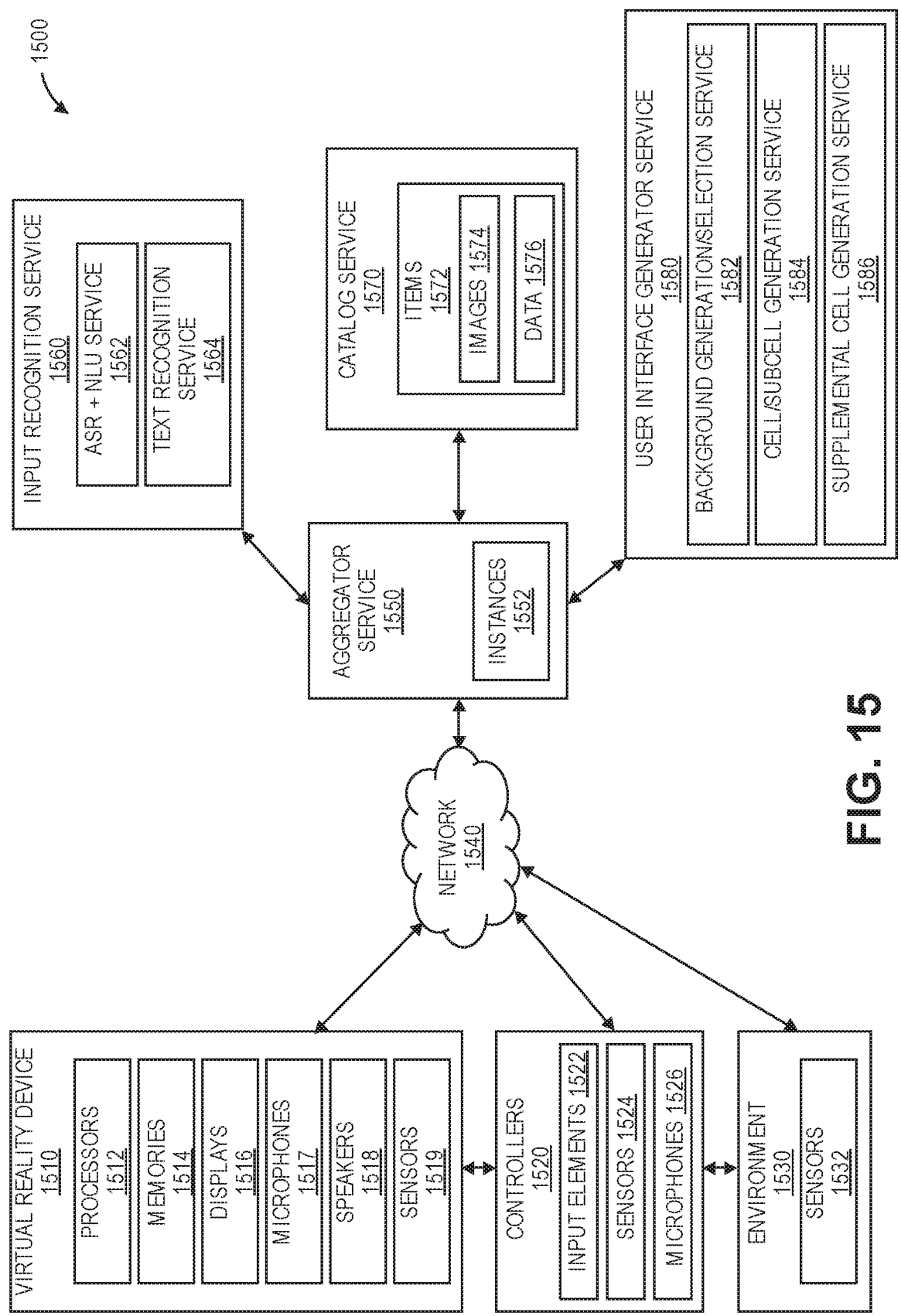
FIG. 15 is a block diagram illustrating various components of a virtual reality system, according to an implementation.

FIG. 15 is a block diagram illustrating various components of a virtual reality system 1500, according to an implementation.

In various examples, the block diagram may be illustrative of one or more aspects of the virtual reality system 1500 that may be used to implement the various systems and processes discussed above. In the illustrated implementation, the virtual reality system 1500 includes a virtual reality device 1510 having one or more associated controllers 1520 and operating within an environment 1530. The virtual reality device 1510, the one or more controllers 1520, and/or the environment 1530 may be in communication with each other and with a network 1540. In addition, an aggregator service 1550 may also be in communication with the network 1540, and the aggregator service 1550 may be in communication with or otherwise operatively connected to one or more of an input recognition service 1560, a catalog service 1570, a user interface generation service 1580, and/or other services.

The virtual reality device 1510 may include one or more processors 1512 in communication with one or more memories 1514, one or more displays 1516, one or more microphones 1517, one or more speakers 1518, and/or one or more sensors 1519. The virtual reality device 1510 may comprise an integrated headset and computing device, a computing device such as a laptop computer, desktop computer, or other stationary computing device in communication with a headset, a removable and/or portable computing device such as a smartphone or cellular phone coupled with a headset, or any other computing device configured to provide a virtual reality user interface for presentation to a user. The processors 1512 may process, transmit, receive, store, and/or retrieve data, e.g., in communication with the memories 1514 and/or via the network 1540, in which the data may be associated with users, items, inputs, user interface elements, or any other aspects described herein.

The displays 1516 or other visual output components may render for presentation to a user of the virtual reality device 1510 the user interface elements, item images, item data, input elements, or any other aspects described herein. For example, the displays 1516 may be stereoscopic displays that are configured to render a three-dimensional, virtual reality environment to a user. In addition, the speakers 1518 or other audio output components may emit to a user of the virtual reality device 1510 any audio output associated with the user interface elements, item images, item data, input elements, or any other aspects described herein. For example, background music may be associated with one or more portions of a three-dimensional model that simulates a background environment, with one or more items or types of items, and/or with one or more positions of the virtual reality user interfaces described herein, such that the background music may change in response to visual changes associated with various portions or sections of the virtual reality user interfaces. Further, the virtual reality device 1510 may also include haptic output components that may emit haptic signals or feedback, e.g., related to any of the various inputs that may be received from a user such as clicks, swipes, holds, or releases, confirmations of various actions such as indicating an interest in an item, adding an item to a cart, or completing a purchase of an item, indications related to the virtual reality user interface such as reaching an end position of the user interface, or any other aspects of the virtual reality user interfaces or interactions therewith by a user as described herein.

The microphones 1517 or other audio input components may receive inputs, e.g., voice inputs, from a user of the virtual reality device 1510. For example, a user may provide a search query via a voice input that is received by the microphones 1517 and processed to provide visual and/or audio output, e.g., via the displays 1516 and speakers 1518, associated with the search query.

In some embodiments, the microphones 1517 may be always activated while a user is using the virtual reality device 1510, such that audio inputs may be received by the microphones 1517 at any time. In addition, an initial or wake-up word or phrase may be used to signal to the virtual reality device 1510 that the user intends to provide a voice input. In other embodiments, the microphones 1517 may be activated by an input element, e.g., within the user interface or on a controller, such that audio inputs may be received by the microphones 1517 responsive to selection of the input element. In still other embodiments, the microphones 1517 may be additionally or alternatively activated or triggered by one or more sensors within one or more of the virtual reality device 1510, the controllers 1520, or the environment 1530. For example, a particular motion of the virtual reality device 1510 as sensed by sensors 1519, a particular motion of the controller 1520 as sensed by sensors 1524, and/or a particular motion of the user as sensed by sensors 1532 may initiate activation of the microphones 1517. In one example embodiment, a sensor 1524 of the controller 1520 may sense a motion of the controller 1520 toward a user's mouth as a trigger to initiate activation of the microphones 1517, even if the microphones 1517 are not physically present within the controller 1520. Further, a label or sticker indicating a microphone may be provided on the controller 1520 to suggest or encourage such action or motion by the user even in the absence of a microphone on the controller 1520.

The sensors 1519 of the virtual reality device 1510 may include one or more accelerometers, gyroscopes, magnetometers, or other sensors. For example, the sensors 1519 may provide data associated with a position, orientation, movement, rotation, speed, or other action or motion of the user utilizing the virtual reality device 1510. In some implementations, the virtual reality device 1510 may be a virtual reality headset that may sense, using one or more of the sensors 1519, various movements of a head of a user, e.g., looking up, down, left, right, or combinations thereof. Further, the sensors 1519 may also include eye gaze tracking sensors that may identify a direction of eye gaze or focus of the user, and the sensed direction of eye gaze or focus may be used as additional inputs for the systems and processes described herein. For example, a sensed direction of eye gaze toward a cell or subcell for a defined amount of time, e.g., 2-5 seconds or longer, may be detected by the eye gaze tracking sensors and recognized as an input such as a selection of the cell or subcell. As another example, a sensed blink of an eye by a user for a defined amount of time, together with a sensed direction of eye gaze, may also be detected by the eye gaze tracking sensors and recognized as an input such as a selection of a cell or subcell. As yet another example, a sensed movement of eye gaze, or a sensed position of eye gaze, e.g., at an edge of the field of view, may also be detected by the eye gaze tracking sensors and recognized as an input such as a scrolling or panning input.

The controllers 1520 may include one or more input elements 1522. For example, the input elements 1522 may include buttons, triggers, switches, toggles, trackballs, trackpads, touchpads, touch-sensitive surfaces, or any other elements configured to receive inputs from a user. The inputs received via the input elements 1522 may be general navigation inputs related to the user interface as a whole, e.g., swiping left or right to pan or scroll the user interface left or right or swiping up or down to alter a level of zoom, may be specific navigation inputs related to one or more aspects or elements within the user interface, e.g., swiping left or right to view additional images or details of one or more items, or may be control or selection inputs specific to one or more aspects or elements rendered by the displays 1516, e.g., selection, removal, placement, expansion, modification, or other interaction with a particular user interface element or entry of text via a keyboard rendered on the displays 1516.

For example, the input elements 1522 may include a primary clickable trackpad, a secondary button, a universal home button, and volume up and down buttons, although other combinations of input elements are also possible. The primary clickable trackpad may receive touch, swipe, single-click, double-click, click and hold, click and swipe, click and pull, or any other inputs described herein. In example embodiments, the swipe, double-click, click and hold, click and swipe, and click and pull inputs described with respect to FIGS. 1A-5 and 8-12 may be received via a primary clickable trackpad. In addition, the secondary button may receive single-click, double-click, click and hold, click and pull, or any other inputs described herein. In an example embodiment, the single-click input described with respect to FIG. 6 may be received via a secondary button. Further, the universal home button may receive single-click, double-click, click and hold, or any other inputs described herein. In an example embodiment, the click and hold input received via a universal home button may redefine or re-center the home position 120 within a current field of view of a user. In another example embodiment, the single-click input received via a universal home button may exit an application or service that renders the virtual reality user interfaces described herein, and return the user to a universal home screen associated with the virtual reality device.

In addition, the controllers 1520 may include one or more sensors 1524. For example, the sensors 1524 may include one or more accelerometers, gyroscopes, magnetometers, image capture devices, or other sensors. For example, the sensors 1524 may provide data associated with a position, orientation, movement, rotation, speed, or other action or motion of the controller by a user. In addition, the image capture devices may capture images of actual surroundings of a user in order to perform inside-out tracking. For example, inside-out tracking may include determining frame-to-frame changes of images captured by such image capture devices in order to determine position, orientation, movement, rotation, speed, or other action or motion of the controller by a user. Moreover, data captured and/or received by one or more of the sensors 1524 may be used together to more accurately determine any of the various aspects related to action or motion of the controller. Further, the controllers 1520 may include one or more microphones 1526 to receive voice inputs. As described herein, the microphones 1526 may be always activated, activated by one or more input elements, and/or activated by one or more triggers such as sensed motions of one or more components.

Further, the controllers 1520 may also include haptic output components that may emit haptic signals or feedback, e.g., related to any of the various inputs that may be received from a user such as clicks, swipes, holds, or releases, confirmations of various actions such as indicating an interest in an item, adding an item to a cart, or completing a purchase of an item, indications related to the virtual reality user interface such as reaching an end position of the user interface, or any other aspects of the virtual reality user interfaces or interactions therewith by a user as described herein.

The environment 1530 may also include one or more sensors 1532. For example, the sensors 1532 may include one or more image capture devices, scanning devices, radar sensors, laser sensors, time of flight sensors, location sensors, or other sensors. For example, the sensors 1532 may provide data associated with a position, orientation, movement, rotation, speed, or other actions or motions of one or more of the virtual reality device 1510, the controllers 1520, a user, or combinations thereof.

Based at least in part on inputs received via one or more of the microphones 1517, sensors 1519, input elements 1522, sensors 1524, microphones 1526, and/or sensors 1532, a user may be able to control a virtual reality experience or environment and interact with various aspects of the user interface elements, item images, item data, or any other aspects described herein.

In some embodiments, one or more inputs may be processed by the processors 1512 in communication with data stored in the memories 1514 of the virtual reality device 1510 to modify or otherwise effect interactions with the user interface elements, item images, item data, or any other aspects described herein. For example, the processors 1512 and memories 1514 may be configured to locally process and modify one or more aspects of the user interface elements, item images, item data, or any other aspects described herein in response to at least a portion of inputs. In addition or alternatively, one or more inputs may be transmitted, with or without processing by the processors 1512 of the virtual reality device 1510, to the aggregator service 1550 via the network 1540 for processing, analysis, and/or recognition to modify or otherwise effect interactions with the user interface elements, item images, item data, or any other aspects described herein.

The network 1540 may be any wired or wireless general data networks, such as a Wi-Fi network, a local area network (LAN), or a wide area network (WAN). In addition, the network 1540 may include other types of networks, including telecommunications networks, cellular communication networks, satellite networks, the Internet, and the like.

The aggregator service 1550 may include one or more processors, one or more memories, and one or more instances 1552. For example, a particular user using a virtual reality device 1510 with associated controllers 1520 within an environment 1530 may be associated with a particular instance 1552 of the aggregator service 1550. The aggregator service 1550 may serve as an intermediate service via a network 1540 between a plurality of virtual reality devices 1510, each associated with a particular instance 1552 of the aggregator service 1550, and one or more additional services 1560, 1570, 1580 configured to support the operation of each of the virtual reality devices 1510.

The aggregator service 1550 may receive inputs and/or data from the virtual reality device 1510, the controllers 1520, and/or the environment 1530, and in turn, provide to the virtual reality device 1510, the controllers 1520, and/or the environment 1530 data associated with user interface elements, items, or any other aspects described herein. For example, in response to a search query for particular items received from a virtual reality device, the aggregator service 1550 may provide to the virtual reality device data associated with user interface elements, items, or any other aspects described herein related to the search query. Similarly, in response to a selection of a collection of items or items related to a particular item received from a virtual reality device, the aggregator service 1550 may provide to the virtual reality device data associated with user interface elements, items, or any other aspects described herein related to the collection of items or items related to the particular item. Further, in response to a selection of a particular item, the aggregator service 1550 may provide to the virtual reality device data associated with user interface elements, additional item images, additional item details, or any other aspects described herein related to the particular item.

In order to provide to the plurality of virtual reality devices 1510 data related to received inputs and/or data, the aggregator service 1550 may transmit and receive data from one or more additional services, including an input recognition service 1560, a catalog service 1570, a user interface generation service 1580, and/or other services.

The input recognition service 1560 may include one or more processors, one or more memories, an automatic speech recognition and natural language understanding service (ASR+NLU) 1562, and a text recognition service 1564. The input recognition service 1560 may receive inputs and/or data from the aggregator service 1550 and process the inputs and/or data to understand a request from a user. For example, if a user has provided a voice input via one or more microphones 1517, 1526 of the virtual reality device 1510 or the controllers 1520, the ASR+NLU service 1562 may receive the voice input via the aggregator service 1550 and process the voice input to recognize and/or understand a user's request. Likewise, if a user has provided a text input via one or more input elements 1522 of the controllers 1520, the text recognition service 1564 may receive the text input via the aggregator service 1550 and process the text input to recognize and/or understand a user's request. Further, the input recognition service 1560 may also receive and process other inputs provided by a user, e.g., selection of one or more user interface elements, navigation within the user interface, or other inputs. Then, the input recognition service 1560 may transmit data associated with the processed and recognized inputs back to the aggregator service 1550. The transmitted data may be associated with an instance 1552 that is associated with a virtual reality device 1510 from which the initial inputs and/or data were received.

Based at least in part on the data received from the input recognition service 1560, the aggregator service 1550 may transmit a request to the catalog service 1570. The catalog service 1570 may include one or more processors, one or more memories, and data associated with items 1572, including item images 1574, item data 1576, or any other details associated with the items. The items may represent any products or services that may be rendered for display and/or selection by a user of a virtual reality device 1510. For example, the items may be available for rent, download, lease, or purchase. Based at least in part on the request from the aggregator service 1550, the catalog service 1570 may transmit data associated with items, including images, data, and other details, back to the aggregator service 1550 that is related to the request. The transmitted data may be associated with an instance 1552 that is associated with a virtual reality device 1510 from which the initial inputs and/or data were received.

Based at least in part on the data received from the input recognition service 1560 and the data received from the catalog service 1570, the aggregator service 1550 may transmit a request to the user interface generation service 1580. The user interface generation service 1580 may include one or more processors, one or more memories, a background generation/selection service 1582, a cell/subcell generation service 1584, and a supplemental cell generation service 1586.

The background generation/selection service 1582 may generate or select a three-dimensional model that simulates a background scene or environment for the user interface to be rendered for a user. As described herein, the three-dimensional model may be a default three-dimensional model, or may be selected based at least in part on user preferences, user input, user selection, search queries, currently viewed items, viewing history, purchasing history, or any other factors. The cell/subcell generation service 1584 may generate the plurality of cells, and also process the images of the items received from the catalog service 1570 in order to divide the cells into subcells. As described herein, the cell/subcell generation service 1584 may determine aspect ratios of the images of the items received from the catalog service 1570 and divide the cells into subcells that are sized based at least in part on the determined aspect ratios of the images. The supplemental cell generation service 1586 may generate one or more supplemental cells that are each associated with a collection of items. The collections of items represented by the supplemental cells may be related to inputs received from the user, or alternatively, one or more of the supplemental cells may represent collections of items that are sponsored or otherwise promoted to one or more users and/or by one or more entities providing the items. Based at least in part on the request from the aggregator service 1550, the user interface generation service 1580 may transmit data associated with three-dimensional models, cells, subcells, supplemental cells, user interface elements, and/or any other data, back to the aggregator service 1550 that is related to the request. The transmitted data may be associated with an instance 1552 that is associated with a virtual reality device 1510 from which the initial inputs and/or data were received.

The aggregator service 1550 may then transmit the data associated with three-dimensional models, cells, subcells, supplemental cells, user interface elements, item images, item data or details, and/or any other data to the virtual reality device 1510 that provided the inputs and/or data associated with the instance 1552. The virtual reality device 1510 may then process, using the processors 1512 and memories 1514, the received data related to the inputs and/or data and render the three-dimensional models, cells, subcells, supplemental cells, user interface elements, item images, item data or details, and/or any other data for presentation via the displays 1516 and/or speakers 1518 to the user in response to the user's request.

In various implementations, the various processors described herein with respect to various components and services of the virtual reality system 1500 may be a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor(s) may commonly, but not necessarily, implement the same ISA.

The various memories, or non-transitory computer readable storage media, described herein with respect to various components and services of the virtual reality system 1500 may be configured to store executable instructions, input data, sensor data, user data, item images, item details, other item data, user interface elements, and/or other data items accessible by the processor(s). In various implementations, the memories may be implemented using any suitable memory technology, such as static random access memory (SRAM), synchronous dynamic RAM (SDRAM), nonvolatile/Flash-type memory, or any other type of memory. In various implementations, program instructions and data implementing desired functions, such as those described above, may be stored within any of the memories of various components and services of the virtual reality system 1500.

In other implementations, program instructions and data may be received, sent or stored upon different types of computer-accessible media, such as non-transitory media, or on similar media separate from the memories or non-transitory computer readable storage medium.

Generally speaking, a non-transitory, computer readable storage medium may include storage media or memory media such as magnetic or optical media, e.g., disk or CD/DVD-ROM, coupled to the components and services of the virtual reality system 1500. Program instructions and data stored via a non-transitory computer readable medium may be transmitted by transmission media or signals, such as electrical, electromagnetic, or digital signals, which may be conveyed via a communication medium such as a network and/or a wireless link.

In various implementations, one or more input/output (I/O) interfaces or network interfaces may be configured to coordinate I/O or network traffic between the processor(s), the memories, any of the devices, components, or services of the virtual reality system 1500, and any other devices, components, or services. In some implementations, the I/O or network interfaces may perform any necessary protocol, timing or other data transformations to convert data signals from one component (e.g., memories) into a format suitable for use by another component (e.g., processor(s)). In some implementations, the I/O or network interfaces may include support for devices, components, or services attached through various types of peripheral buses, such as a variant of the Peripheral Component Interconnect (PCI) bus standard or the Universal Serial Bus (USB) standard, for example. In some implementations, the function of the I/O or network interfaces may be split into two or more separate components, such as a north bridge and a south bridge, for example. Also, in some implementations, some or all of the functionality of the I/O or network interfaces, such as interfaces to the memories, may be incorporated directly into the processor(s).

In addition, the network interfaces may enable wired or wireless communication between various components and services of the virtual reality system 1500. In various implementations, the network interfaces may support communication via wired or wireless general data networks, such as a Wi-Fi network, LAN, or WAN. Further, the network interfaces may support communication via other types of networks, including telecommunications networks, cellular communication networks, satellite networks, the Internet, and the like.

The memories of various components and services of the virtual reality system 1500 may include program instructions which may be configured to implement the example processes and/or sub-processes described above. The data storage may include various data stores for maintaining data items such as input data including voice inputs, text inputs, or controller inputs, sensor data from sensors associated with the virtual reality device, the controllers, or the environment, user data including user preferences, user history, user lists, or other user data, item data including images, details, or other item data, user interface elements including three-dimensional models, cells, subcells, supplemental cells, or other user interface elements, and/or other data items that may be provided for generating and interacting with virtual reality user interfaces as described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the virtual reality system 1500 is merely illustrative and is not intended to limit the scope of the present disclosure. In particular, the computing system, devices, and services may include any combination of hardware or software that can perform the indicated functions, including computers, network devices, internet appliances, PDAs, wireless phones, pagers, etc. The virtual reality system 1500 may also be connected to other devices or services that are not illustrated, or instead may operate as a stand-alone system. In addition, the functionality provided by the illustrated components and services may, in some implementations, be combined in fewer components or distributed in additional components or services. Similarly, in some implementations, the functionality of some of the illustrated components or services may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated components or services of the virtual reality system 1500. Some or all of the system components, services, or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the virtual reality system 1500 may be transmitted to the virtual reality system 1500 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other virtual reality system configurations.

Those skilled in the art will appreciate that, in some implementations, the functionality provided by the processes, systems, and services discussed above may be provided in alternative ways, such as being split among more software modules or routines or consolidated into fewer modules or routines. Similarly, in some implementations, illustrated processes, systems, and services may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes, systems, and services as illustrated in the figures and described herein represent example implementations. The processes, systems, and services may be implemented in software, hardware, or a combination thereof in other implementations. Similarly, the order of any process may be changed and various elements may be added, reordered, combined, omitted, modified, etc., in other implementations.

Embodiments of the disclosure can be described in view of the following clauses:

Clause 1. A computer-implemented method of generating a virtual reality interface, comprising:

generating a three-dimensional model that simulates an actual environment;

generating a plurality of cells, the plurality of cells arranged at a simulated depth from a virtual position of a user, the plurality of cells arranged with a simulated curvature that extends around the virtual position of the user, and the plurality of cells positioned within a portion of an available field of view of the user;

identifying a plurality of images to be included in the plurality of cells;

determining an aspect ratio for individual ones of the plurality of images;

dividing individual ones of the plurality of cells into a plurality of subcells, individual ones of the plurality of subcells including a respective image of the plurality of images, and individual ones of the plurality of subcells being sized based at least in part on a respective aspect ratio of the respective image; and rendering, for display within a field of view of the user via a display of a virtual reality headset, the three-dimensional model and the plurality of subcells including respective images such that the plurality of subcells overlay at least a portion of the three-dimensional model at a perceived depth and a perceived curvature corresponding to the simulated depth and the simulated curvature.

Clause 2. The computer-implemented method of clause 1, wherein objects within the three-dimensional model are rendered within the field of view of the user such that the objects appear to correspond to an actual size of the actual environment.

Clause 3. The computer-implemented method of clauses 1 to 2, wherein the plurality of cells are arranged in a grid within a plane having the simulated curvature around the virtual position of the user and at the simulated depth from the virtual position of the user.

Clause 4. The computer-implemented method of clauses 1 to 3, wherein the simulated curvature has a greater visual curvature at a lower portion of the plurality of cells relative to an upper portion of the plurality of cells.

Clause 5. A computer-implemented method, comprising:
selecting a three-dimensional model that simulates an environment;
generating a plurality of cells, the plurality of cells arranged at a simulated depth and with a simulated curvature;
dividing at least one of the plurality of cells into a plurality of subcells, at least one of the plurality of subcells being sized to include a respective image; and
rendering, for display to a user via a display of a virtual reality device, the three-dimensional model and the at least one of the plurality of subcells including the respective image over at least a portion of the three-dimensional model.

Clause 6. The computer-implemented method of clause 5, wherein selecting the three-dimensional model further comprises:
identifying at least one characteristic associated with at least one of the user, an input received from the user, or an item represented in the respective image; and
selecting the three-dimensional model from a plurality of three-dimensional models based at least in part on the at least one characteristic.

Clause 7. The computer-implemented method of clauses 5 to 6, wherein the simulated depth is between approximately eight feet and approximately twelve feet from a position of the user, and the simulated curvature indicates that the plurality of cells extends around the position of the user.

Clause 8. The computer-implemented method of clauses 5 to 7, wherein the simulated curvature is indicated by a visual curvature associated with at least one of an upper edge or a lower edge of the plurality of cells.

Clause 9. The computer-implemented method of clauses 5 to 8, wherein the plurality of cells are arranged in a grid beginning at a home position and extending to a right side of a field of view of the user approximately 170 degrees around a position of the user and extending to a left side of a field of view of the user approximately 30 degrees around the position of the user.

Clause 10. The computer-implemented method of clauses 5 to 9, further comprising:
identifying a collection of items to be associated with a supplemental cell;
selecting a supplemental image representative of the collection of items; and
rendering the supplemental cell including the supplemental image at a position around an outer edge of the plurality of cells.

Clause 11. The computer-implemented method of clauses 5 to 10, further comprising:
selecting a first cell of the plurality of cells;
identifying a collection of items to be associated with the first cell;
selecting a first image representative of the collection of items; and
rendering the first cell including the first image such that the first cell is visually distinguished from other cells of the plurality of cells.

Clause 12. The computer-implemented method of clauses 5 to 11, further comprising:
identifying a plurality of images to be included in the plurality of cells;
determining an aspect ratio for individual ones of the plurality of images;
dividing individual ones of the plurality of cells into a plurality of subcells, individual ones of the plurality of subcells including a respective image of the plurality of images, and individual ones of the plurality of subcells being sized based at least in part on a respective aspect ratio of the respective image; and
rendering the plurality of subcells including respective images over at least a portion of the three-dimensional model.

Clause 13. The computer-implemented method of clauses 5 to 12, wherein individual ones of the plurality of subcells within a respective cell are divided independently of others of the plurality of cells.

Clause 14. The computer-implemented method of clauses 5 to 13, wherein at least one respective plurality of subcells within a respective cell include respective images of related items; and further comprising:
visually emphasizing the at least one respective plurality of subcells by at least one of highlighting or encircling.

Clause 15. The computer-implemented method of clauses 5 to 14, wherein the plurality of images include representations of at least one of searched items, selected items, recommended items, previously viewed items, or previously ordered items.

Clause 16. A system for generating a virtual reality interface, comprising:
at least one processor in communication with a memory and a virtual reality device, the at least one processor configured to at least:
select a three-dimensional model that simulates an environment;
generate a plurality of cells, the plurality of cells arranged at a simulated depth and with a simulated curvature;
divide at least one of the plurality of cells into a plurality of subcells, at least one of the plurality of subcells being sized to include a respective image; and
cause rendering, for display to a user on a display of the virtual reality device, of the three-dimensional model and the at least one of the plurality of subcells including the respective image over at least a portion of the three-dimensional model.

Clause 17. The system of clause 16, wherein the at least one processor is further configured to at least:
receive a plurality of images from a catalog service;
determine an aspect ratio for individual ones of the plurality of images;
divide individual ones of the plurality of cells into a plurality of subcells, individual ones of the plurality of subcells including a respective image of the plurality of images, and individual ones of the plurality of subcells being sized based at least in part on a respective aspect ratio of the respective image; and cause rendering of the plurality of subcells including respective images over at least a portion of the three-dimensional model.

Clause 18. The system of clauses 16 to 17, wherein the at least one processor is further configured to at least:

receive an input from a user; and transmit data associated with the input to the catalog service, wherein the plurality of images received from the catalog service are associated with the input.

Clause 19. The system of clauses 16 to 18, wherein the at least one processor is further configured to at least:

transmit the input to an input recognition service, the input recognition service including at least one of an automatic speech recognition and natural language understanding service or a text recognition service; and receive a processed input from the input recognition service;

wherein the data associated with the input that is transmitted to the catalog service includes the processed input, and the processed input is associated with the plurality of images received from the catalog service.

Clause 20. The system of clauses 16 to 19, wherein the input received from the user is at least one of a voice input, an alphanumeric input, or an input received via a controller.

Clause 21. A computer-implemented method of operating a virtual reality interface, comprising:

receiving a search query from a user;

generating a three-dimensional model that simulates an actual environment based at least in part on the search query;

generating a plurality of cells, the plurality of cells arranged at a simulated depth from a virtual position of the user, the plurality of cells arranged with a simulated curvature that extends around the virtual position of the user, and the plurality of cells positioned within a portion of an available field of view of the user;

identifying a plurality of images to be included in the plurality of cells based at least in part on the search query;

determining an aspect ratio for individual ones of the plurality of images;

dividing individual ones of the plurality of cells into a plurality of subcells, individual ones of the plurality of subcells including a respective image of the plurality of images, and individual ones of the plurality of subcells being sized based at least in part on a respective aspect ratio of the respective image; and rendering, for display within a field of view of the user via a display of a virtual reality headset, the three-dimensional model and the plurality of subcells including respective images such that the plurality of subcells overlay at least a portion of the three-dimensional model at a perceived depth and a perceived curvature corresponding to the simulated depth and the simulated curvature.

Clause 22. The computer-implemented method of clause 21, wherein the search query comprises at least one of a voice input or an alphanumeric input.

Clause 23. The computer-implemented method of clauses 21 to 22, wherein the voice input is received via a microphone associated with the virtual reality headset that renders the three-dimensional model and the plurality of subcells.

Clause 24. The computer-implemented method of clauses 21 to 23, wherein the microphone is at least one of always activated, activated in response to a defined input received via a controller, or activated in response to a defined motion of the controller.

Clause 25. A computer-implemented method, comprising:

receiving a first input from a user;

generating a plurality of cells, the plurality of cells arranged at a simulated depth and with a simulated curvature;

dividing at least one of the plurality of cells into a plurality of subcells, at least one of the plurality of subcells being sized to include a respective image that is associated with the first input; and rendering, for display to the user via a display of a virtual reality device, the at least one of the plurality of subcells including the respective image.

Clause 26. The computer-implemented method of clause 25, wherein the first input comprises a search query; and further comprising:

selecting a three-dimensional model that simulates an environment, wherein the three-dimensional model is selected based at least in part on the search query; and identifying a plurality of images based at least in part on the search query, wherein the respective image is selected from the plurality of images.

Clause 27. The computer-implemented method of clauses 25 to 26, wherein the first input comprises a selection of a collection of items represented by a supplemental cell; and further comprising:

selecting a three-dimensional model that simulates an environment, wherein the three-dimensional model is selected based at least in part on the collection of items; and identifying a plurality of images based at least in part on the collection of items, wherein the respective image is selected from the plurality of images.

Clause 28. The computer-implemented method of clauses 25 to 27, wherein the first input comprises a selection of an option to view other items related to an item represented by the at least one of the plurality of subcells; and further comprising:

selecting a three-dimensional model that simulates an environment, wherein the three-dimensional model is selected based at least in part on the item; and identifying a plurality of images based at least in part on the item, wherein the respective image is selected from the plurality of images.

Clause 29. The computer-implemented method of clauses 25 to 28, further comprising:

receiving a second input from the user, the second input comprising at least one of a horizontal swipe motion or a vertical swipe motion received via a controller; and altering at least one of a horizontal position or a zoom of the at least one of the plurality of subcells including the respective image based at least in part on the second input.

Clause 30. The computer-implemented method of clauses 25 to 29, further comprising:

responsive to an increase in a level of zoom, rendering additional information associated with an item associated with the at least one of the plurality of subcells;

wherein the additional information includes at least one of a level of interest in the item, a price of the item, or at least one detail about the item.

Clause 31. The computer-implemented method of clauses 25 to 30, further comprising:

receiving a second input from the user, the second input comprising a single click within the at least one of the plurality of subcells received via a controller; and rendering at least one selectable option associated with an item associated with the at least one of the plurality of subcells based at least in part on the second input, the at least one selectable option including at least one of an option to indicate interest in the item, an option to add the item to an electronic cart, an option to view details related to the item, an option to view other items related to the item, or an option to purchase the item.

Clause 32. The computer-implemented method of clauses 25 to 31, further comprising:

receiving a second input from the user, the second input comprising a double click within the at least one of the plurality of subcells received via a controller; and rendering an acknowledgment of interest in the item based at least in part on the second input.

Clause 33. The computer-implemented method of clauses 25 to 32, further comprising:

receiving a second input from the user, the second input comprising a click-hold-move-release within the at least one of the plurality of subcells received via a controller;

rendering a removal of the at least one of the plurality of subcells from a position within the plurality of subcells based at least in part on the click-hold of the second input; and rendering a placement of the at least one of the plurality of subcells at a new position overlaying at least a portion of the plurality of subcells based at least in part on the move-release of the second input.

Clause 34. The computer-implemented method of clauses 25 to 33, wherein the at least one of the plurality of subcells is rendered at the new position with an increased level of zoom; and further comprising:

responsive to the increased level of zoom, rendering additional information associated with an item associated with the at least one of the plurality of subcells;

wherein the additional information includes at least one of a level of interest in the item, a customer rating of the item, a price of the item, or at least one detail about the item.

Clause 35. The computer-implemented method of clauses 25 to 34, further comprising:

receiving a third input from the user, the third input comprising a horizontal swipe motion within the at least one of the plurality of subcells received via the controller; and horizontally scrolling at least one of additional details or additional images associated with the item associated with the at least one of the plurality of subcells based at least in part on the third input.

Clause 36. The computer-implemented method of clauses 25 to 35, further comprising:

receiving a third input from the user, the third input comprising a click-hold-pull within the at least one of the plurality of subcells received via the controller;

rendering a removal of the at least one of the plurality of subcells from the new position based at least in part on the click-hold of the third input; and rendering a replacement of the plurality of subcells with the at least one of the plurality of subcells based at least in part on the pull of the third input.

Clause 37. The computer-implemented method of clauses 25 to 36, further comprising:

receiving a second input from the user, the second input comprising a click-hold-move-release within a first cell of the plurality of cells received via a controller;

rendering a removal of the first cell from a position within the plurality of cells based at least in part on the click-hold of the second input; and rendering a placement of the first cell at a new position overlaying at least a portion of the plurality of cells based at least in part on the move-release of the second input.

Clause 38. The computer-implemented method of clauses 25 to 37, wherein the first cell is rendered at the new position with an increased level of zoom; and further comprising:

responsive to the second input, dividing the first cell into a plurality of first subcells, individual ones of the plurality of first subcells being sized to include a respective image that is associated with the first cell.

Clause 39. The computer-implemented method of clauses 25 to 38, further comprising:

receiving a third input from the user, the third input comprising a click-hold-pull within the plurality of first subcells received via the controller;

rendering a removal of the plurality of first subcells from the new position based at least in part on the click-hold of the third input; and rendering a replacement of the plurality of subcells with the plurality of first subcells based at least in part on the pull of the third input.

Clause 40. A system for operating a virtual reality interface, comprising:

a virtual reality device;

a controller;

a microphone; and at least one processor in communication with a memory, the virtual reality device, the controller, and the microphone, the at least one processor configured to at least:

receive a first input from a user via at least one of the virtual reality device, the controller, or the microphone;

generate a plurality of cells, the plurality of cells arranged at a simulated depth and with a simulated curvature;

divide at least one of the plurality of cells into a plurality of subcells, at least one of the plurality of subcells being sized to include a respective image that is associated with the first input; and cause rendering, for display to the user via a display of the virtual reality device, the at least one of the plurality of subcells including the respective image.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method of generating a virtual reality interface, comprising:

causing display, via a display device of a virtual reality headset, of a background environment within a field of view of a user; and causing display, via the display device of the virtual reality headset, of a plurality of cells overlaid onto the background environment within the field of view of the user;

wherein individual cells of the plurality of cells include respective images;
wherein the plurality of cells are displayed vertically in front of a virtual position of the user;
wherein the plurality of cells are displayed with a simulated curvature around the virtual position of the user;
wherein an upper edge and a lower edge of the plurality of cells are displayed as concave, curved lines; and
wherein the plurality of cells include a first plurality of cells having a first size and a second plurality of cells having a second size, the first size being different from the second size.

2. The computer-implemented method of claim 1, wherein the first plurality of cells having the first size are displayed as a first group, and the second plurality of cells having the second size are displayed as a second group.

3. The computer-implemented method of claim 1, wherein the plurality of cells are displayed with respective shapes that visually indicate the simulated curvature around the virtual position of the user.

4. A computer-implemented method, comprising:
causing display, via a display device of a virtual reality headset, of a plurality of cells overlaid onto a background environment within a field of view of a user;
wherein the plurality of cells are displayed vertically in front of a virtual position of the user;
wherein the plurality of cells are displayed with a simulated curvature around the virtual position of the user; and
wherein the plurality of cells are displayed with a plurality of different sizes.

5. The computer-implemented method of claim 4, wherein an upper edge and a lower edge of the plurality of cells are displayed as concave, curved lines that visually indicate the simulated curvature around the virtual position of the user.

6. The computer-implemented method of claim 4, wherein the plurality of cells are displayed with respective shapes that visually indicate the simulated curvature around the virtual position of the user.

7. The computer-implemented method of claim 4, wherein individual cells of the plurality of cells having a same size from among the plurality of different sizes are displayed adjacent to each other.

8. The computer-implemented method of claim 4, wherein individual cells of the plurality of cells include respective images.

9. The computer-implemented method of claim 8, wherein individual cells of the plurality of cells that include related images are displayed adjacent to each other.

10. The computer-implemented method of claim 4, wherein the plurality of cells are displayed between a home position and an end position associated with the simulated curvature around the virtual position of the user.

11. The computer-implemented method of claim 4, further comprising:
causing display, via the display device of the virtual reality headset, of at least one supplemental cell overlaid onto the background environment at least partially within the field of view of the user.

12. The computer-implemented method of claim 11, wherein the at least one supplemental cell is displayed at least one of:
to the left of a home position associated with the simulated curvature around the virtual position of the user,
to the right of an end position associated with the simulated curvature around the virtual position of the user,
above the plurality of cells that are displayed vertically in front of the virtual position of the user, or
below the plurality of cells that are displayed vertically in front of the virtual position of the user.

13. The computer-implemented method of claim 4, further comprising:
causing display, via the display device of the virtual reality headset, of at least one selectable option overlaid onto the background environment at least partially within the field of view of the user and below the plurality of cells that are displayed vertically in front of the virtual position of the user;
wherein the at least one selectable option comprises at least one of a selectable home option, a selectable search option, or a selectable account option.

14. The computer-implemented method of claim 4, further comprising:
receiving, via an input device, an input associated with a cell of the plurality of cells; and
modifying, via the display device of the virtual reality headset, at least one visual characteristic of the cell within the field of view of the user responsive to receiving the input.

15. The computer-implemented method of claim 14, further comprising:
causing display, via the display device of the virtual reality headset, of at least one additional detail associated with the cell at least partially overlaid onto the cell within the field of view of the user responsive to receiving the input.

16. The computer-implemented method of claim 15, wherein the at least one additional detail comprises a selectable purchase option.

17. The computer-implemented method of claim 15, wherein the at least one additional detail comprises at least one of a name, a detail, a customer rating, or a price of an object associated with the cell.

18. A system for generating a virtual reality interface, comprising:
at least one processor in communication with a memory and a virtual reality device, the at least one processor configured to at least:
cause display, via a display device of the virtual reality device, of a plurality of cells overlaid onto a background environment within a field of view of a user;
wherein the plurality of cells are displayed vertically in front of a virtual position of the user;
wherein the plurality of cells are displayed with a simulated curvature around the virtual position of the user; and
wherein the plurality of cells are displayed with a plurality of different sizes.

* * * * *